US011231917B2

(12) United States Patent
Nikko et al.

(10) Patent No.: US 11,231,917 B2
(45) Date of Patent: Jan. 25, 2022

(54) INFORMATION PROCESSING APPARATUS, COMPUTER-READABLE RECORDING MEDIUM STORING THEREIN COMPILER PROGRAM, AND COMPILING METHOD

(71) Applicant: FUJITSU LIMITED, Kawasaki (JP)

(72) Inventors: Tomoko Nikko, Numazu (JP); Shuichi Chiba, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 51 days.

(21) Appl. No.: 16/421,534

(22) Filed: May 24, 2019

(65) Prior Publication Data
US 2019/0391795 A1 Dec. 26, 2019

(30) Foreign Application Priority Data

Jun. 20, 2018 (JP) .............................. JP2018-116777

(51) Int. Cl.
*G06F 8/41* (2018.01)
(52) U.S. Cl.
CPC .......... *G06F 8/4434* (2013.01); *G06F 8/4442* (2013.01)
(58) Field of Classification Search
CPC .............................. G06F 8/4434; G06F 8/4442
See application file for complete search history.

(56) References Cited

U.S. PATENT DOCUMENTS

| 5,586,325 | A | * | 12/1996 | MacDonald | G06F 8/447 712/E9.038 |
| 7,062,761 | B2 | * | 6/2006 | Slavin | G06F 8/31 717/151 |
| 8,015,556 | B2 | * | 9/2011 | Cui | G06F 12/0253 717/154 |
| 9,250,878 | B1 | * | 2/2016 | McCallum | G06F 8/4434 |
| 9,733,908 | B2 | * | 8/2017 | Slavin | G06F 9/5016 |
| 10,360,003 | B2 | * | 7/2019 | Slavin | G06F 8/41 |
| 2003/0014588 | A1 | * | 1/2003 | Hu | G06F 12/0848 711/118 |
| 2003/0014607 | A1 | * | 1/2003 | Slavin | G06F 9/5016 711/170 |

(Continued)

FOREIGN PATENT DOCUMENTS

| JP | 2004-362216 | 12/2004 |
| JP | 2007-328692 | 12/2007 |
| JP | 2008-217134 | 9/2008 |

*Primary Examiner* — Matthew J Brophy
(74) *Attorney, Agent, or Firm* — Fujitsu Patent Center

(57) ABSTRACT

An information processing apparatus includes a memory; and a processor coupled to the memory and the processor configured to when source code includes an instruction for storing units of data in an area of an N-dimensional variable-length array (N being an integer and a value of N being equal to or greater than 2), generate object code in the memory to cause the units of data to be stored in an area of an N-dimensional fixed-length array instead of the area of the N-dimensional variable-length array, and when the source code includes an instruction for successively accessing the unit of data stored in the area of the N-dimensional variable-length array, generate the object code in the memory to cause the units of data stored in the area of the N-dimensional fixed-length array to be stored contiguously in an area of a one-dimensional fixed-length array.

9 Claims, 23 Drawing Sheets

(56) References Cited

U.S. PATENT DOCUMENTS

| | | | |
|---|---|---|---|
| 2004/0168027 A1* | 8/2004 | Hu | G06F 12/0848 |
| | | | 711/120 |
| 2004/0221281 A1 | 11/2004 | Suganuma | |
| 2006/0195661 A1* | 8/2006 | Hu | G06F 12/0875 |
| | | | 711/120 |
| 2006/0221747 A1* | 10/2006 | Slavin | G06F 8/31 |
| | | | 365/222 |
| 2007/0240137 A1* | 10/2007 | Archambault | G06F 8/4442 |
| | | | 717/140 |
| 2007/0299892 A1 | 12/2007 | Nakahara | |
| 2010/0174876 A1 | 7/2010 | Kasahara et al. | |
| 2013/0007721 A1* | 1/2013 | Slavin | G06F 8/41 |
| | | | 717/140 |
| 2014/0304691 A1* | 10/2014 | Slavin | G06F 8/41 |
| | | | 717/140 |
| 2015/0046913 A1* | 2/2015 | Cui | G06F 12/02 |
| | | | 717/152 |
| 2017/0322784 A1* | 11/2017 | Slavin | G06F 8/31 |
| 2018/0157470 A1* | 6/2018 | Matsuura | G06F 8/443 |
| 2019/0114150 A1* | 4/2019 | Ogasawara | G06F 8/4441 |

* cited by examiner

FIG. 11 data2

| Data1-1 | 0x1000 |
| Data1-2 | 0x1008 |
| Data1-3 | 0x1016 |
| Data1-4 | 0x1024 |
| Data2-1 | 0x1032 |
| Data2-2 | 0x1040 |
| Data3-1 | 0x1048 |
| Data3-2 | 0x1056 |
| Data3-3 | 0x1064 |

FIG. 13
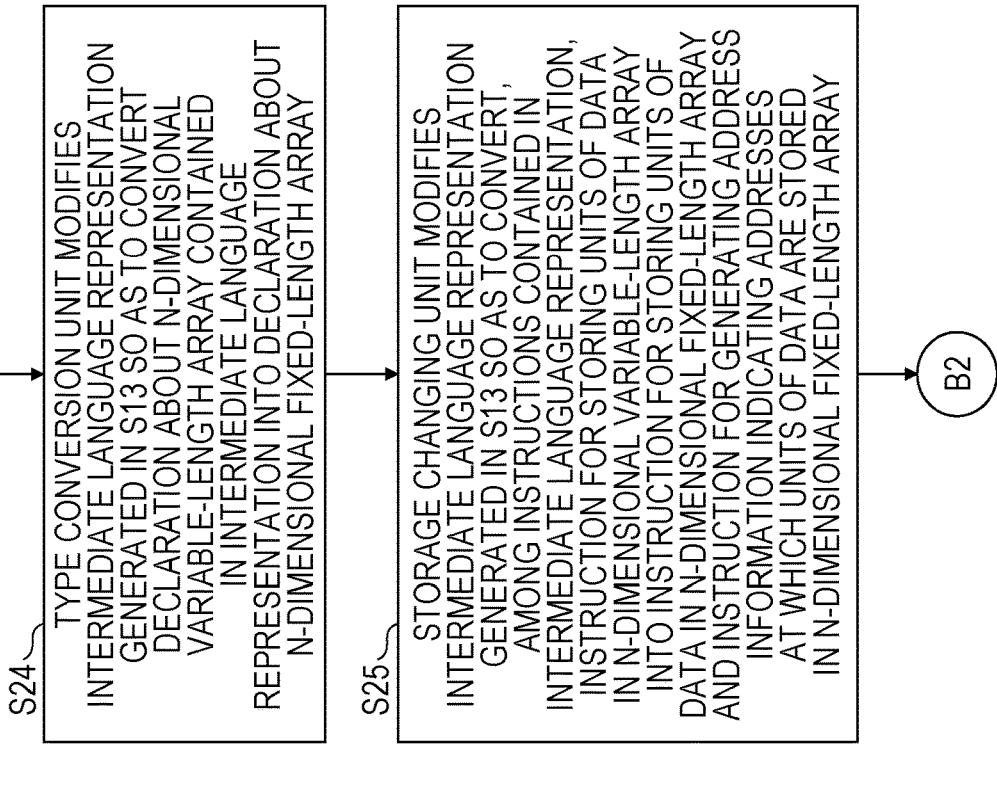
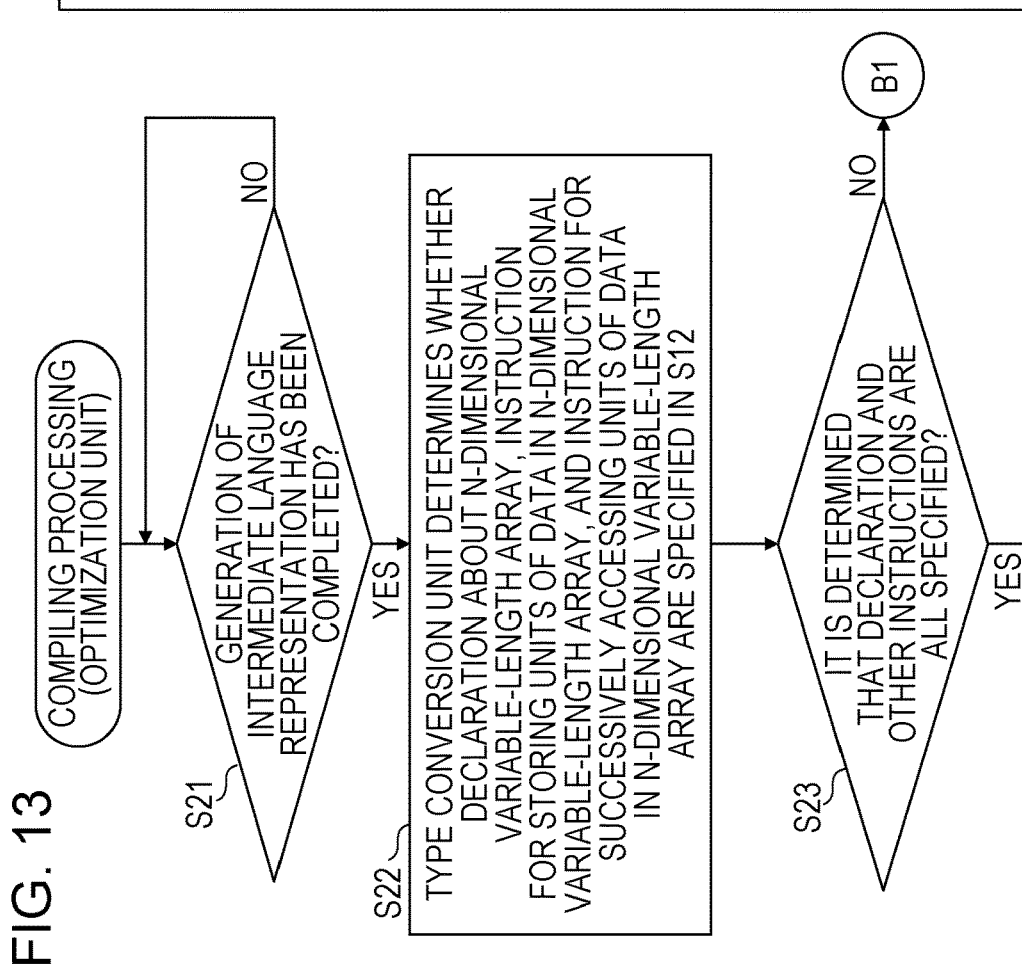

FIG. 18

```
vector<vector<double>> v    CODE1 for (int i = 0; i < m; ++i) {
  v.push_back(vector<double>(width)) ;
}
for (int i = 0; i < m; ++i) {
  for (int j = 0; j < v[i].size(); ++j) {    CODE2
    v[i][j].push_back(<double>j*1.5);
  }
}
                                              CODE3
vector<vector> :: iterator inner_v;
vector<double> :: iterator value
for(inner_v = v.begin(); inner_v != v.end(); inner_v++) {
  for(value = inner_v.begin(); value != inner_v.end(); value++) {
    tmp  = *value + n;
  }
}
```

FIG. 21

| RECORD NUMBER | vector COUNT | ADDRESS | NUMBER OF UNITS OF DATA |
|---|---|---|---|
| 1 | 1 | 0x0100 | 4 |
| 2 | 2 | 0x0200 | 2 |
| 3 | 3 | 0x0300 | 3 |

FIG. 22 data2

| | |
|---:|---|
| 0 | 0x1000 |
| 1.5 | 0x1008 |
| 3.0 | 0x1016 |
| 4.5 | 0x1024 |
| 0 | 0x1032 |
| 1.5 | 0x1040 |
| 0 | 0x1048 |
| 1.5 | 0x1056 |
| 3.0 | 0x1064 |

FIG. 23 data2_box (First dimension)

0x3000 → 0x2000

(Second dimension)

| | |
|---|---|
| 0 | 0x3000 |
| 1.5 | 0x3008 |
| 3.0 | 0x3016 |
| 4.5 | 0x3024 |
| 0 | 0x3032 |
| 1.5 | 0x3040 |
| 0 | 0x3048 |
| 1.5 | 0x3056 |
| 3.0 | 0x3064 |

FIG. 24 data3_box (Second dimension)
0x4000 | 0x3000

(First dimension)
0x3000 | 0x2000

(Third dimension)
| 0   | 0x4000 |
| 1.5 | 0x4008 |
| 3.0 | 0x4016 |
| 4.5 | 0x4024 |
| 0   | 0x4032 |
| 1.5 | 0x4040 |
| 0   | 0x4048 |
| 1.5 | 0x4056 |
| 3.0 | 0x4064 |

INFORMATION PROCESSING APPARATUS, COMPUTER-READABLE RECORDING MEDIUM STORING THEREIN COMPILER PROGRAM, AND COMPILING METHOD

CROSS-REFERENCE TO RELATED APPLICATION

This application is based upon and claims the benefit of priority of the prior Japanese Patent Application No. 2018-116777, filed on Jun. 20, 2018, the entire contents of which are incorporated herein by reference.

FIELD

The embodiments discussed herein are related to an information processing apparatus, a computer-readable recording medium storing therein a compiler program, and a compiling method.

BACKGROUND

For example, a compiler (hereinafter also referred to as a compiler program) that compiles source code written in C++ generates object code from selected source code used as an input. Specifically, the compiler generates an intermediate language representation from the selected source code by, for example, analyzing syntax used in the source code and semantics of the source code. The compiler then, for example, optimizes the generated intermediate language representation and generates object code from the optimized intermediate language representation. As such, performing compilation enables, for example, reducing time taken for executing object code and resources used for executing the object code (see, for example, Japanese Laid-open Patent Publication Nos. 2008-217134, 2007-328692, and 2004-362216).

SUMMARY

According to an aspect of the embodiments, an information processing apparatus includes a memory; and a processor coupled to the memory and the processor configured to when source code includes an instruction for storing units of data in an area of an N-dimensional variable-length array (N being an integer and a value of N being equal to or greater than 2), generate object code in the memory to cause the units of data to be stored in an area of an N-dimensional fixed-length array instead of the area of the N-dimensional variable-length array, and when the source code includes an instruction for successively accessing the unit of data stored in the area of the N-dimensional variable-length array, generate the object code in the memory to cause the units of data stored in the area of the N-dimensional fixed-length array to be stored contiguously in an area of a one-dimensional fixed-length array.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 illustrates a specific example of a one-dimensional fixed-length array;

FIG. 13 is a flowchart illustrating details of compiling processing of the first embodiment;

FIG. 18 illustrates a specific example of source code;

FIG. 21 illustrates a specific example of address information;

FIG. 22 illustrates a specific example in execution of an instruction modified in processing in S32;

FIG. 23 illustrates another specific example in execution of the instruction modified in processing in S32; and FIG. 24 illustrates still another specific example in execution of the instruction modified in processing in S32.

DESCRIPTION OF EMBODIMENTS

The source code described above may include, for example, an instruction for accessing units of data stored in discrete memory locations (for example, data stored in a multidimensional variable-length array). The instructions may include "for", "do while", and/or "while" statements, and the like. The instructions may further include a function and/or an expression. Executing object code generated from source code including such an instruction may cause a large number of cache misses, and as a result, a degradation in the efficiency of executing the instruction may occur in a central processing unit (CPU) coupled to a data cache.

The compiler therefore preferably generates object code with which it is possible to suppress a decrease in the cache hit rate when the object code is generated from source code including an instruction with which units of data stored in discrete memory locations are successively accessed.

Configuration of Information Processing System

Figure 1:
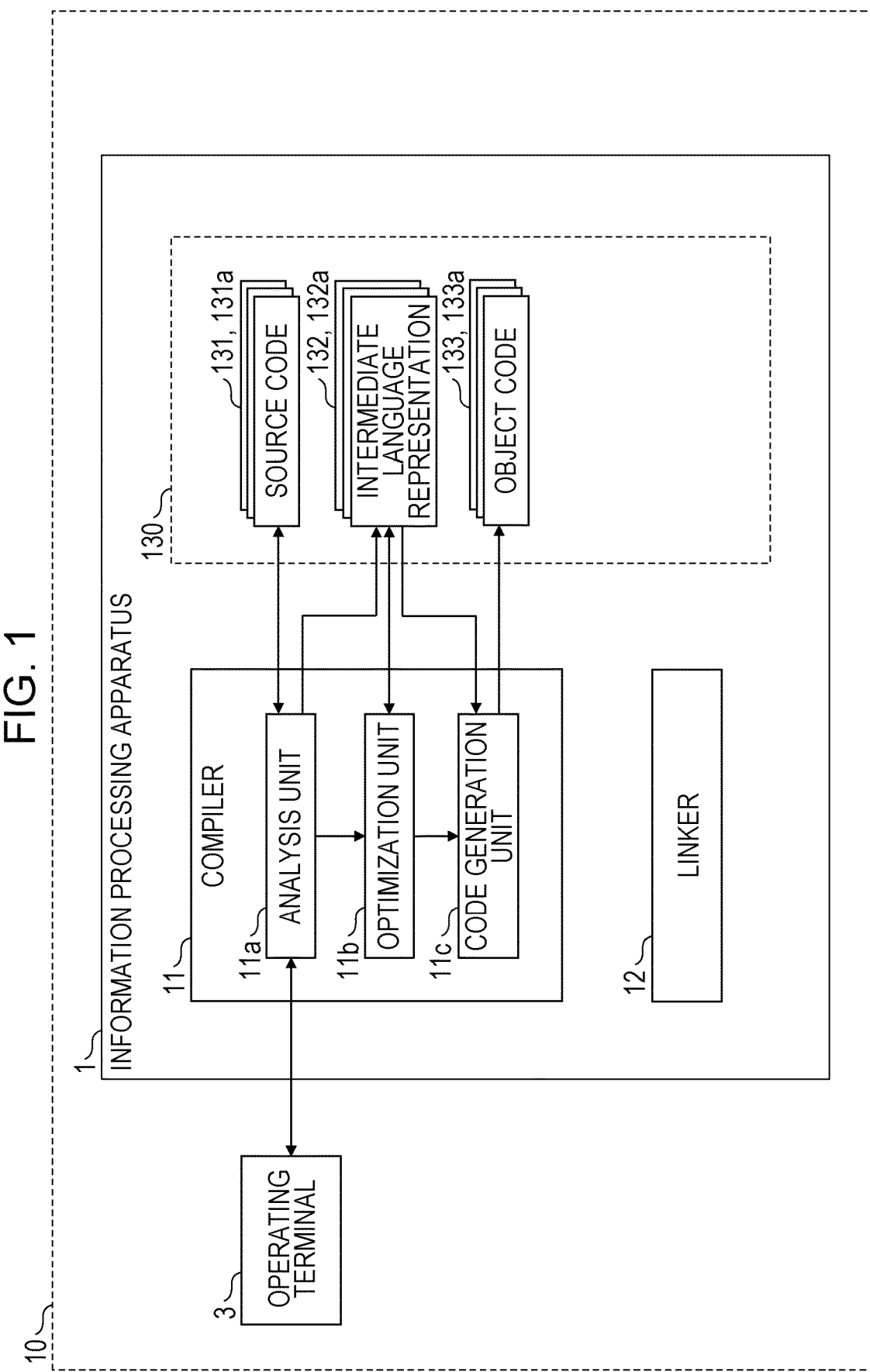
FIG. 1 illustrates an example of a configuration of an information processing system.
Figure 2:
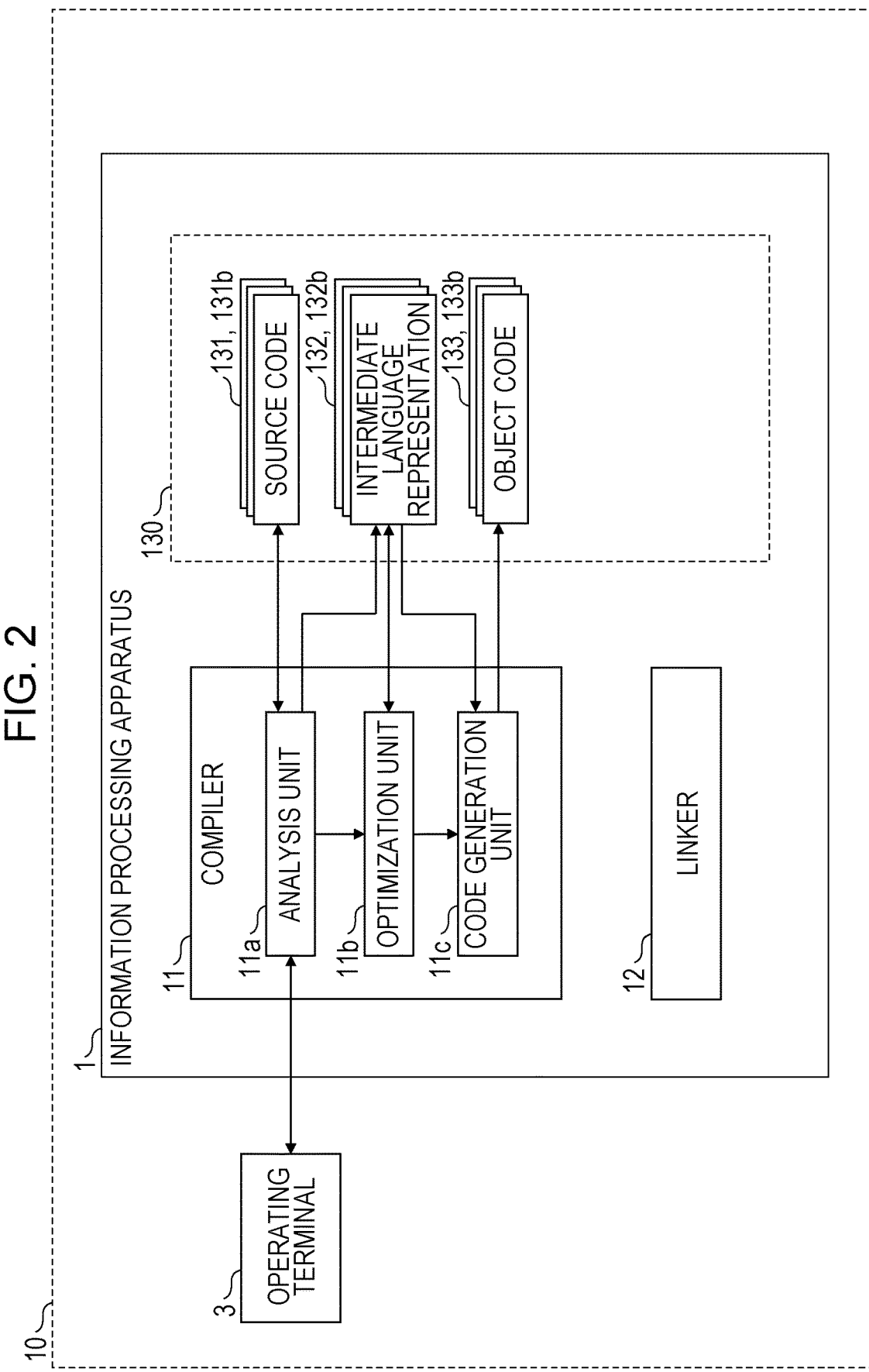
FIG. 2 illustrates another example of the configuration of the information processing system.
Figure 3:
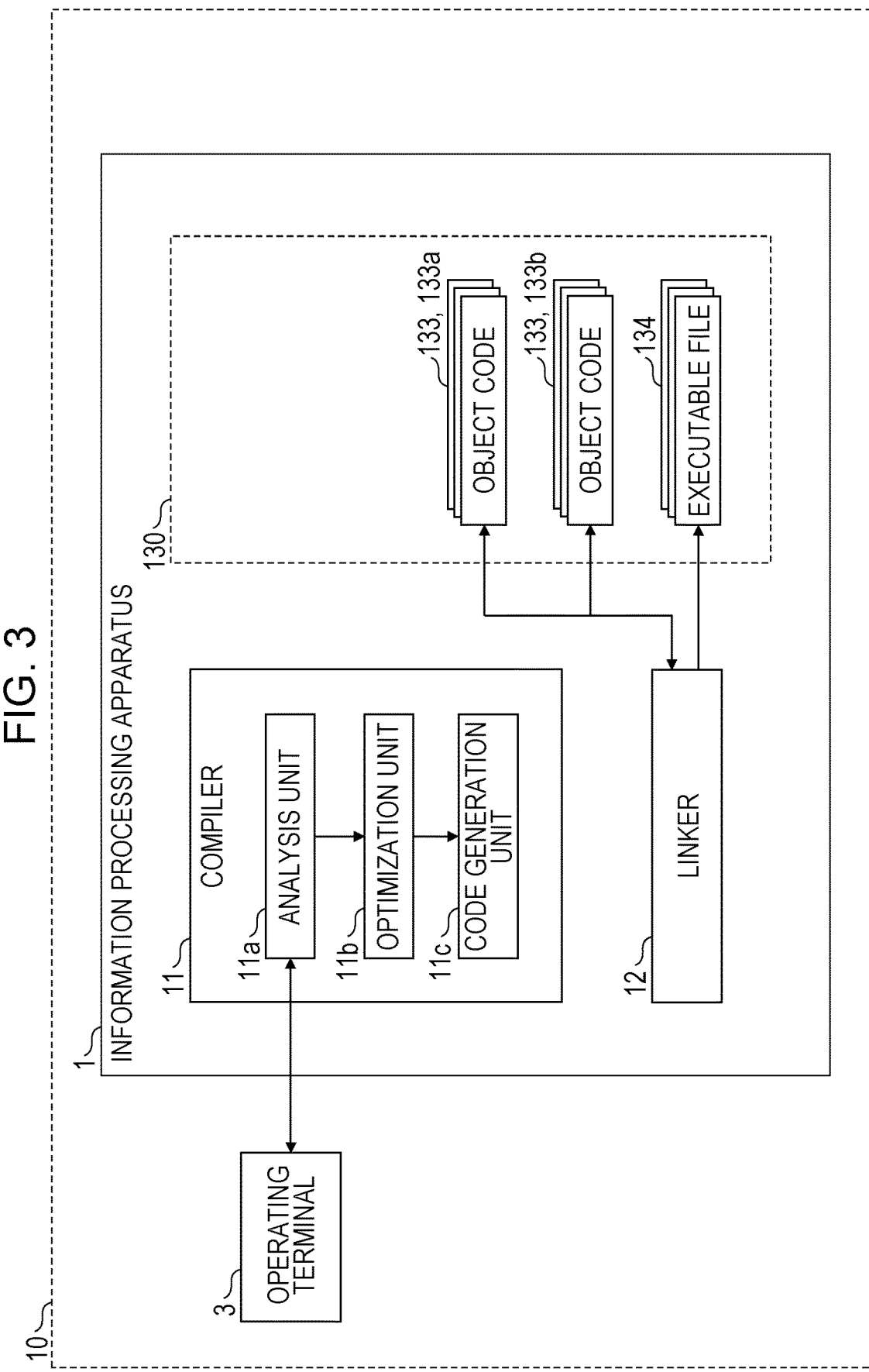
FIG. 3 illustrates still another example of the configuration of the information processing system.

FIGS. 1 to 3 illustrate examples of a configuration of an information processing system 10. The information processing system 10 illustrated in FIGS. 1 to 3 includes an information processing apparatus 1 and an operating terminal 3.

In the information processing apparatus 1, various functions including, for example, a compiler 11 and a linker 12, are implemented by a CPU (not illustrated) and various programs organically cooperating with each other.

The compiler 11 generates, for example, object code 133 from source code 131 stored in an information storage area 130. The compiler 11 includes, for example, an analysis unit 11a, an optimization unit 11b, and a code generation unit 11c. The analysis unit 11a generates an intermediate language representation 132 from the source code 131 by analyzing syntax and semantics of sequences of characters in the source code 131. The optimization unit 11b optimizes the intermediate language representation 132 generated by the analysis unit 11a. The code generation unit 11c generates the object code 133 from the intermediate language representation 132 optimized by the optimization unit 11b.

Specifically, the analysis unit 11a generates, for example, the intermediate language representation 132 of a library (hereinafter also referred to as the intermediate language representation 132a) from the source code 131 of the library (hereinafter also referred to as the source code 131a) as illustrated in FIG. 1. The code generation unit 11c then generates the object code 133 of the library (hereinafter also referred to as the object code 133a) from the intermediate language representation 132a optimized by the optimization unit 11b and stores the object code 133a in the information storage area 130.

The analysis unit 11a also generates, for example, the intermediate language representation 132 of an application (hereinafter also referred to as the intermediate language representation 132b) from the source code 131 of the application (hereinafter also referred to as the source code 131b) as illustrated in FIG. 2. The code generation unit 11c then generates the object code 133 of the application (hereinafter also referred to as the object code 133b) from the intermediate language representation 132b optimized by the optimization unit 11b and stores the object code 133b in the information storage area 130.

The linker 12, for example, generates an executable file 134 by linking the object code 133a generated from the source code 131a and the object code 133b generated from the source code 131b as illustrated in FIG. 3.

The source code 131b described above may include, for example, an instruction for accessing units of data stored in discrete memory locations (for example, data stored in a multidimensional variable-length array). Executing the object code 133b generated from the source code 131b including such an instruction may cause a large number of cache misses, and as a result, a degradation in the efficiency of executing the instruction may occur in the CPU (not illustrated) of the information processing apparatus 1.

The compiler 11 therefore preferably generates object code with which it is possible to suppress a decrease in the cache hit rate when the object code 133b is generated from the source code 131b including such an instruction with which units of data stored in discrete memory locations are successively accessed.

In this respect, when compiling the source code 131b, in a case where the source code 131b includes an instruction for storing units of data (hereinafter also referred to as particular data) in an N-dimensional variable-length array (N is an integer equal to or greater than 2), the compiler 11 of the present embodiment generates the object code 133b so as to cause the particular data to be stored in an N-dimensional fixed-length array instead of the N-dimensional variable-length array.

When compiling the source code 131b, in a case where the source code 131b includes an instruction for successively accessing units of data stored in an N-dimensional variable-length array, the compiler 11 generates the object code 133b so as to cause the units of data stored in the N-dimensional fixed-length array to be stored contiguously in a one-dimensional fixed-length array and cause the units of data stored in the one-dimensional fixed-length array to be successively accessed.

In other words, in a case where the source code 131 includes an instruction for storing units of data in an N-dimensional variable-length array, the compiler 11 of the present embodiment generates the object code 133 by converting the instruction for storing units of data in an N-dimensional variable-length array into an instruction for storing units of data contiguously in a one-dimensional fixed-length array.

In this manner, the compiler 11 is able to generate the object code 133b in which access to data stored in non-contiguous memory locations is suppressed. The compiler 11 is therefore able to generate the object code 133b with which a higher cache hit rate in execution of the object code 133b is achieved.

Hardware Configuration of Information Processing System

Figure 4:
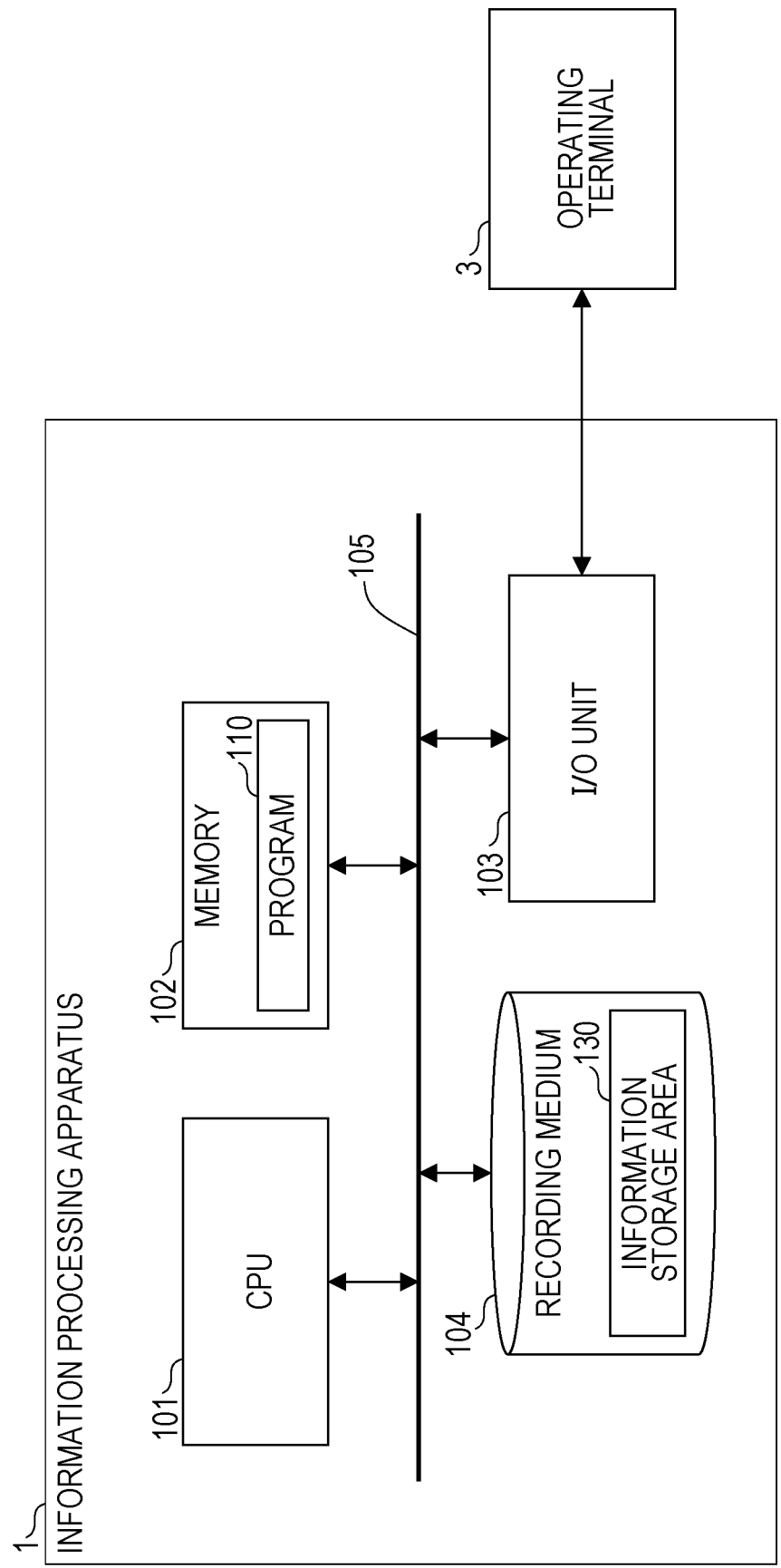
FIG. 4 illustrates a hardware configuration of the information processing apparatus.

Next, a hardware configuration of the information processing system 10 is described. FIG. 4 illustrates a hardware configuration of the information processing apparatus 1.

The information processing apparatus 1 includes a CPU 101 as a processor, a memory 102, an external interface (an input/output (I/O) unit) 103, and a recording medium 104. These components are coupled to each other via a bus 105. The processor may be a single CPU, a multiple-CPU, or a multi-core CPU. The CPU 101 may include a data cache. The data cache coupled to the CPU 101 and the memory 102.

The recording medium 104 includes, for example, a program storage area (not illustrated) for storing a program 110 for performing processing for compiling the source code 131 (hereinafter also referred to as compiling processing). The recording medium 104 also includes, for example, the information storage area 130 (hereinafter also referred to as the memory unit 130 or the memory 130) that is used when compiling processing is performed. The recording medium 104 may be, for example, a hard disk drive (HDD).

The CPU 101 performs compiling processing by running the program 110 loaded into the memory 102 from the recording medium 104.

The external interface 103 communicates with, for example, the operating terminal 3.

Functions of Information Processing System

Figure 5:
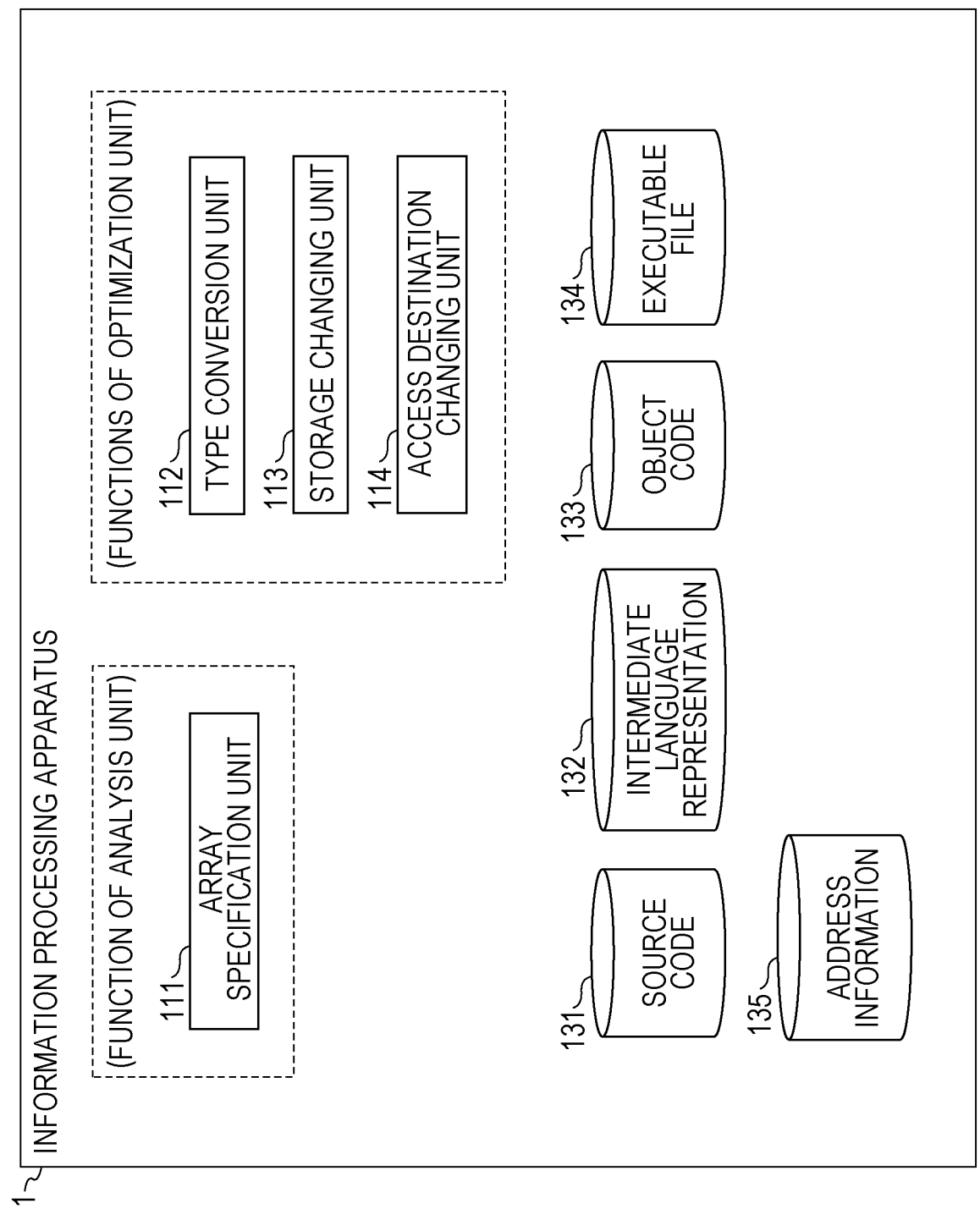
FIG. 5 is a block diagram illustrating functions of the information processing apparatus.

Next, functions of the information processing system 10 are described. FIG. 5 is a block diagram illustrating functions of the information processing apparatus 1.

In the information processing apparatus 1, as illustrated in FIG. 5, an array specification unit 111 is implemented as a function of the analysis unit 11a of the compiler 11 by hardware devices such as the CPU 101 and the memory 102 and the program 110 organically cooperating with each other. Furthermore, in the information processing apparatus 1, as illustrated in FIG. 5, a type conversion unit 112, a storage changing unit 113, and an access destination changing unit 114 are implemented as functions of the optimization unit 11b of the compiler 11 by hardware devices such as the CPU 101 and the memory 102 and the program 110 organically cooperating with each other.

The information processing apparatus 1 stores the source code 131, the intermediate language representation 132, the object code 133, the executable file 134, and address information 135 in the information storage area 130 as illustrated in FIG. 5. In the following description, the source code 131 includes the source code 131*a* and 131*b* illustrated in, for example, FIG. 1, the intermediate language representation 132 includes the intermediate language representations 132*a* and 132*b* illustrated in, for example, FIG. 1, and the object code 133 includes the object code 133*a* and 133*b* illustrated in, for example, FIG. 1.

The array specification unit 111 of the analysis unit 11*a* specifies, among the statements of the source code 131*b* stored in the information storage area 130, a declaration about an N-dimensional variable-length array, an instruction for storing units of data in an N-dimensional variable-length array, and an instruction for successively accessing units of data in an N-dimensional variable-length array.

When the array specification unit 111 specifies the declaration about an N-dimensional variable-length array and the instructions, the type conversion unit 112 of the optimization unit 11*b* converts information about an N-dimensional variable-length array into information about an N-dimensional fixed-length array in the intermediate language representation 132*b* generated from the source code 131*b* by the analysis unit 11*a*.

When the array specification unit 111 specifies the declaration about an N-dimensional variable-length array and the instructions, the storage changing unit 113 of the optimization unit 11*b* modifies the intermediate language representation 132*b* generated by the analysis unit 11*a* so as to cause units of data to be stored in an N-dimensional fixed-length array instead of an N-dimensional variable-length array.

When the array specification unit 111 specifies the declaration about an N-dimensional variable-length array and the instructions, the access destination changing unit 114 of the optimization unit 11*b* modifies the intermediate language representation 132*b* generated by the analysis unit 11*a* so as to cause units of data stored in an N-dimensional fixed-length array to be stored contiguously in a one-dimensional fixed-length array and cause the units of data stored in the one-dimensional fixed-length array to be successively accessed. The address information 135 will be described later.

Outline of First Embodiment

Figure 6:
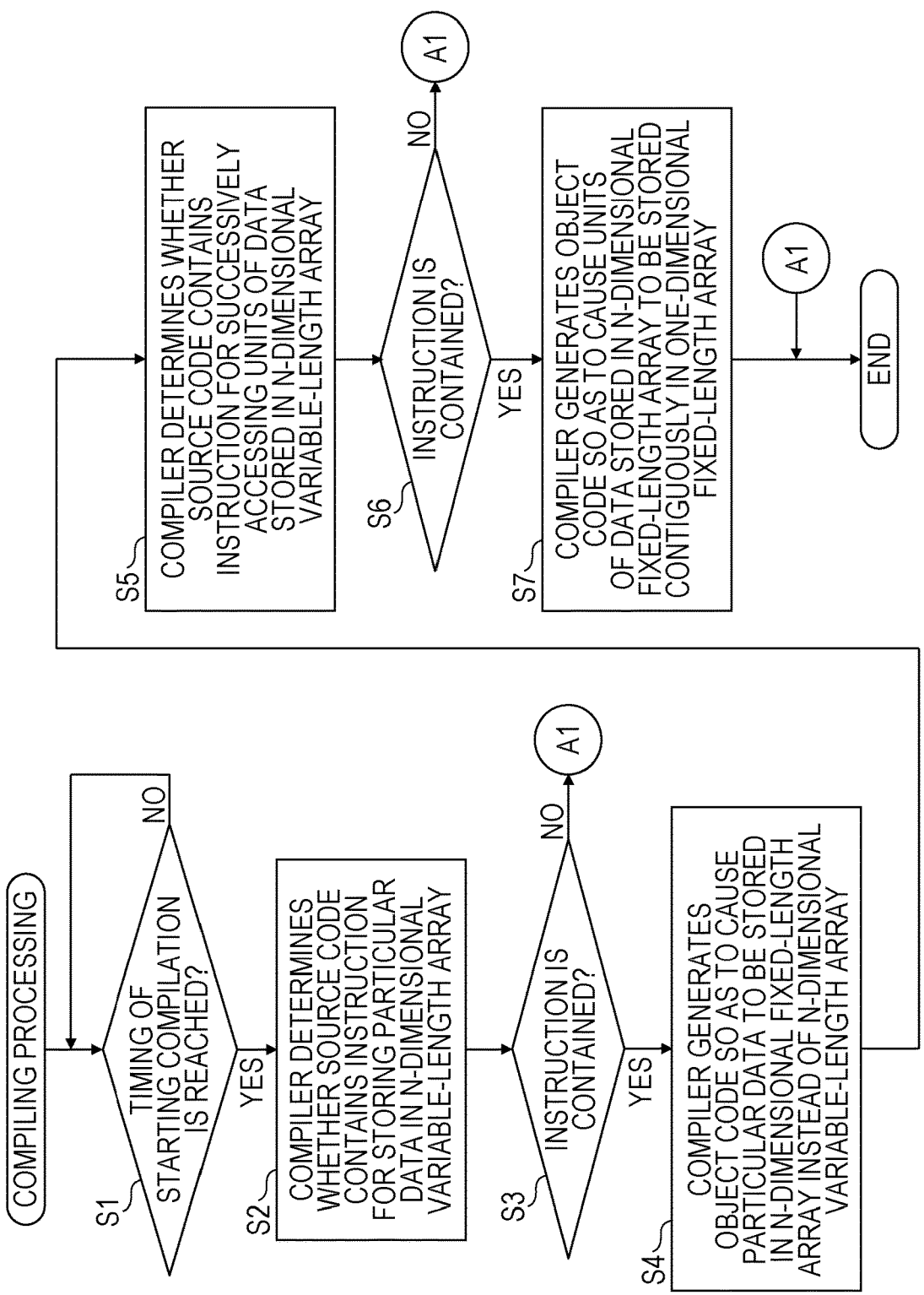
FIG. 6 is a flowchart illustrating an outline of compiling processing of a first embodiment.
Figure 7:
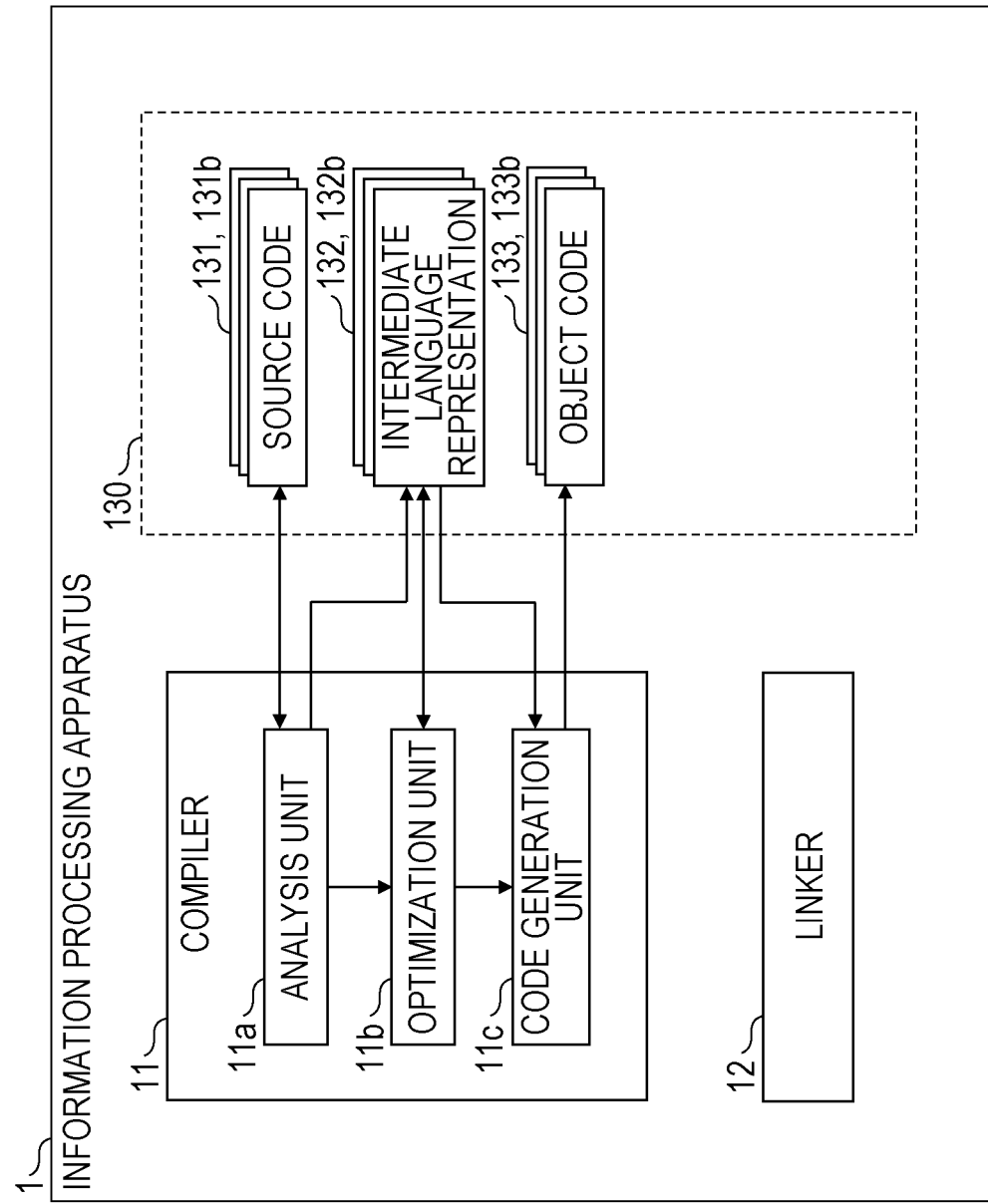
FIG. 7 is a diagram outlining the compiling processing of the first embodiment.
Figure 8:
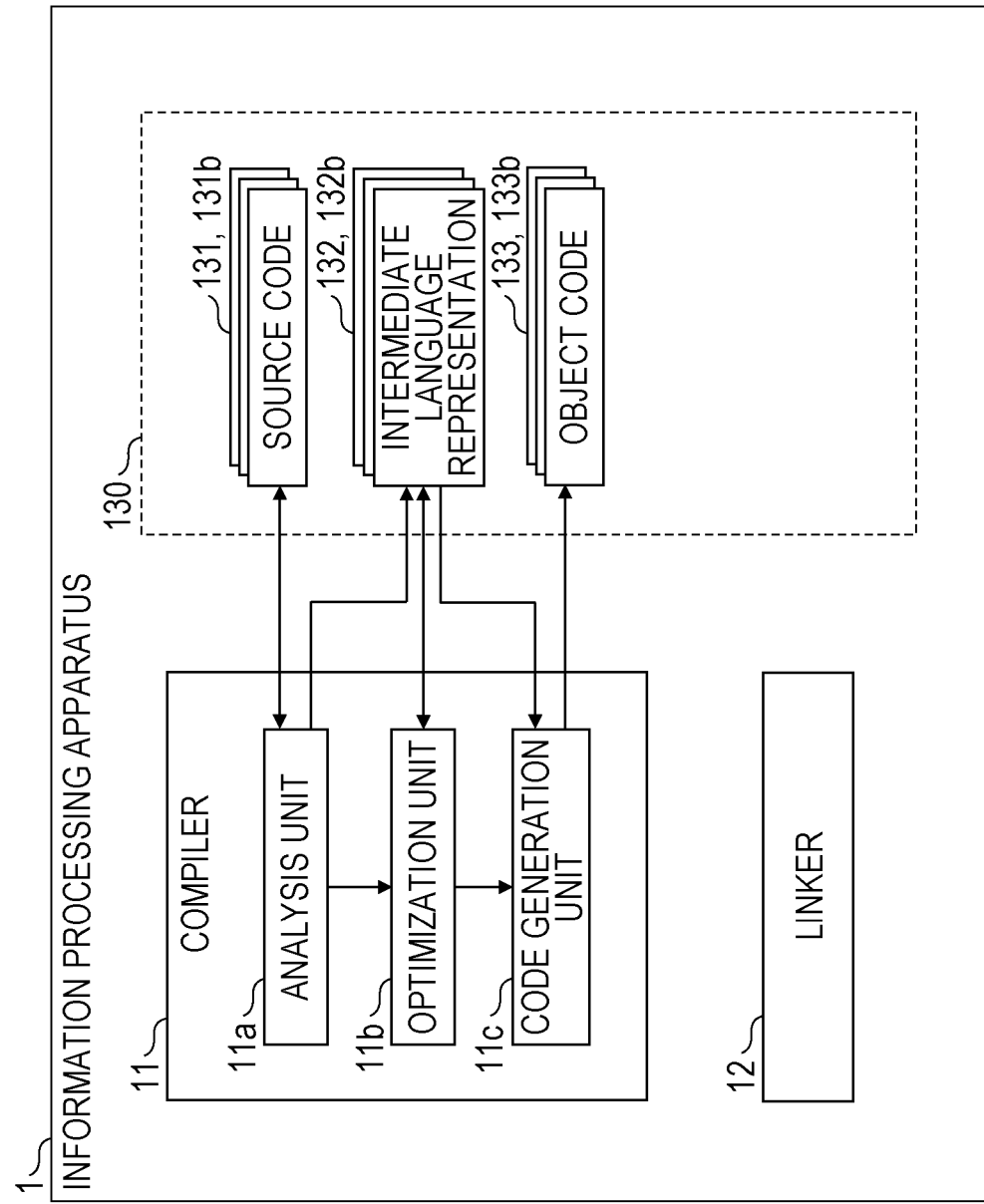
FIG. 8 is a diagram outlining the compiling processing of the first embodiment.

Next, an outline of a first embodiment is described. FIG. 6 is a flowchart illustrating an outline of compiling processing of the first embodiment. FIGS. 7 and 8 are diagrams outlining the compiling processing of the first embodiment.

As illustrated in FIG. 6, the compiler 11 waits until the timing of starting compilation of the source code 131*b* is reached (NO in S1). Specifically, the compiler 11 waits until, for example, an operator who performs a compiling processing operation inputs, via the operating terminal 3, an instruction for compiling the source code 131*b*.

When the timing of starting compilation of the source code 131*b* is reached (YES in S1), the compiler 11 determines whether the source code 131*b* (the intermediate language representation 132*b*) includes an instruction for storing particular data in an N-dimensional variable-length array (S2).

In a case where it is determined that an instruction for storing particular data in an N-dimensional variable-length array is included (YES in S3), the compiler 11 generates the object code 133*b* from the source code 131*b* (the intermediate language representation 132*b*) so as to cause the particular data to be stored in an N-dimensional fixed-length array instead of an N-dimensional variable-length array (S4).

The compiler 11 subsequently determines whether the source code 131*b* includes an instruction for successively accessing units of data stored in an N-dimensional variable-length array (S5).

In a case where it is determined that an instruction for successively accessing units of data stored in an N-dimensional variable-length array is included (YES in S6), the compiler 11 generates the object code 133*b* so as to cause the units of data stored in an N-dimensional fixed-length array to be stored contiguously in a one-dimensional fixed-length array and cause the units of data stored in the one-dimensional fixed-length array to be successively accessed (S7).

Specifically, as illustrated in FIG. 7, when the intermediate language representation 132*b* generated by the analysis unit 11*a* of the compiler 11 includes an instruction for storing particular data in an N-dimensional variable-length array, the optimization unit 11*b* of the compiler 11 modifies the intermediate language representation 132*b* so as to cause the particular data to be stored in an N-dimensional fixed-length array.

Furthermore, as illustrated in FIG. 8, when the intermediate language representation 132*b* generated by the analysis unit 11*a* includes an instruction for successively accessing units of data stored in an N-dimensional variable-length array, the optimization unit 11*b* modifies the intermediate language representation 132*b* so as to cause the units of data stored in an N-dimensional fixed-length array to be stored contiguously in a one-dimensional fixed-length array and cause the units of data stored in the one-dimensional fixed-length array to be successively accessed.

In addition, the optimization unit 11*b* optimizes the intermediate language representation 132*b* generated by the analysis unit 11*a* further as desired. Subsequently, the code generation unit 11*c* generates the object code 133*b* from the intermediate language representation 132*b* optimized by the optimization unit 11*b*.

Specific Example of Processing in S4

Next, a specific example of the processing in S4 is described.

Figure 9:
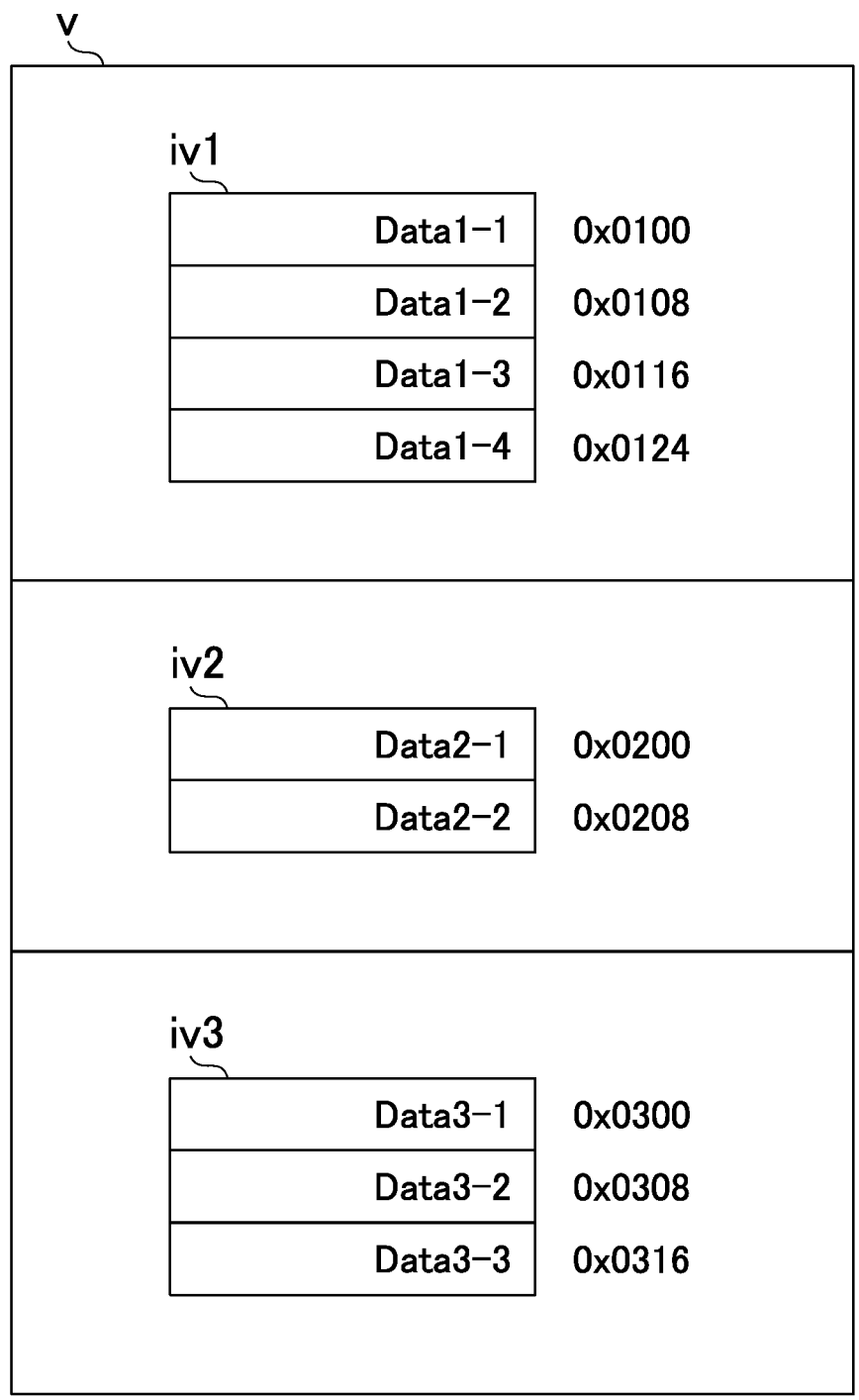
FIG. 9 illustrates a specific example of a two-dimensional variable-length array.
Figure 10:
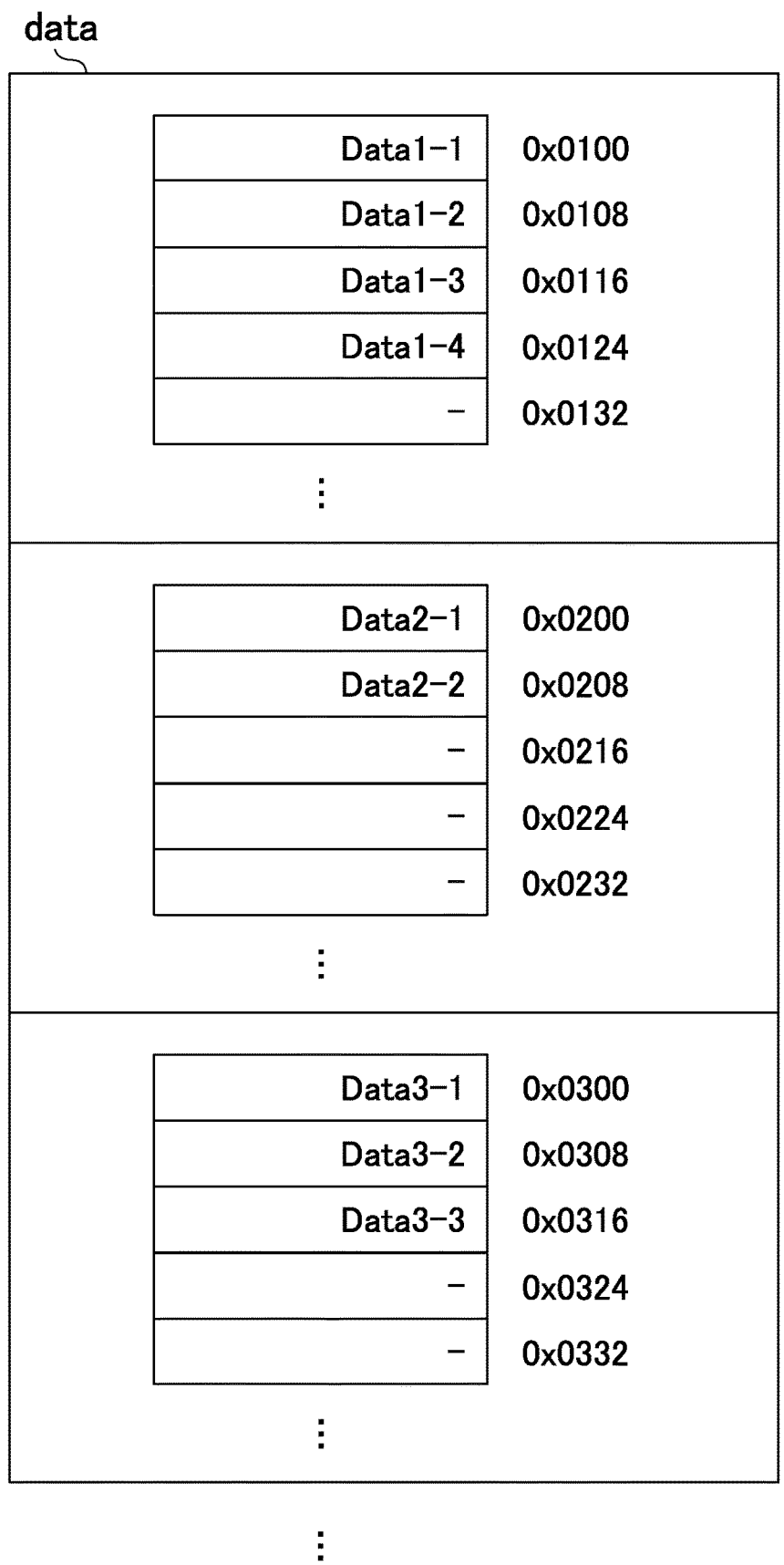
FIG. 10 illustrates a specific example of a two-dimensional fixed-length array.

FIG. 9 is a diagram for describing a specific example of a two-dimensional variable-length array. FIG. 10 is a diagram for describing a specific example of a two-dimensional fixed-length array. Specifically, FIG. 9 illustrates an array, namely array v, which is a two-dimensional variable-length array of a class template vector<vector<class T>> in C++. FIG. 10 illustrates another array, namely array data, which is a two-dimensional fixed-length array of a class template Array<Array<class T>> in C++ and has a size of [100][100].

In the examples in FIGS. 9 and 10, identical units of data are stored in both the array v and the array data [100][100]. The size of the array data is determined in advance by, for example, an operator.

Firstly, the array v illustrated in FIG. 9 is described. The array v illustrated in FIG. 9 includes an array iv1, an array iv2, and an array iv3.

The array iv1 illustrated in FIG. 9 includes Data1-1 stored in a location at address 0x0100, Data1-2 stored in a location at address 0x0108, Data1-3 stored in a location at address 0x0116, and Data1-4 stored in a location at address 0x0124.

The array iv2 illustrated in FIG. 9 includes Data2-1 stored in a location at address 0x0200 and Data2-2 stored in a location at address 0x0208.

The array iv3 illustrated in FIG. 9 includes Data3-1 stored in a location at address 0x0300, Data3-2 stored in a location at address 0x0308, and Data3-3 stored in a location at address 0x0316.

Next, the array data illustrated in FIG. 10 is described. The array data illustrated in FIG. 10 includes, as elements of the first dimension, Data1-1 stored in a location at address 0x0100, Data1-2 stored in a location at address 0x0108, Data1-3 stored in a location at address 0x0116, and Data1-4 stored in a location at address 0x0124. Among the elements in the locations of the first dimension of the array data illustrated in FIG. 10, no data is stored in elements in locations at address 0x0132 or subsequent addresses.

The array data illustrated in FIG. 10 also includes, as elements of the second dimension, Data2-1 stored in a location at address 0x0200 and Data2-2 stored in a location at address 0x0208. Among the elements in the locations of the second dimension of the array data illustrated in FIG. 10, no data is stored in elements in locations at address 0x0216 or subsequent addresses.

The array data illustrated in FIG. 10 also includes, as elements of the third dimension, Data3-1 stored in a location at address 0x0300, Data3-2 stored in a location at address 0x0308, and Data3-3 stored in a location at address 0x0316. Among the elements in the locations of the third dimension of the array data illustrated in FIG. 10, no data is stored in elements in locations at address 0x0324 or subsequent addresses. Furthermore, no data is stored in elements in locations of the fourth dimension of the array data illustrated in FIG. 10 or subsequent dimensions.

For example, when the source code 131b includes an instruction for storing units of data in the array v, the compiler 11 modifies the intermediate language representation 132b so as to cause units of data to be stored not in the array v (not stored as illustrated in FIG. 9) but in the array data (stored as illustrated in FIG. 10) (S4).

Specific Example of Processing in S7

Next, a specific example of the processing in S7 is described.

FIG. 11 illustrates a specific example of a one-dimensional fixed-length array. FIG. 11 illustrates an array, namely array data2, which is a one-dimensional fixed-length array of a class template Array<class T> in C++ and has a size of [8]. The size of the array data2 is determined to, for example, correspond to the number of elements in which units of data are stored in the array data illustrated in FIG. 10.

For example, when the source code 131b includes an instruction for successively accessing the units of data stored in the array v, the compiler 11 causes the units of data stored in the array data as a two-dimensional fixed-length array (stored as illustrated in FIG. 10) to be stored in series in the array data2 as a one-dimensional fixed-length array illustrated as FIG. 11. The compiler 11 then successively accesses the units of data stored in the array data2 (S7).

In other words, in a case where the source code 131 includes an instruction for storing units of data in an N-dimensional variable-length array, the compiler 11 of the present embodiment generates the object code 133 by converting the instruction for storing units of data in an N-dimensional variable-length array into an instruction for storing units of data contiguously in a one-dimensional fixed-length array.

In this manner, the compiler 11 is able to generate the object code 133b in which access to data stored in non-contiguous memory locations is suppressed. The compiler 11 is therefore able to generate the object code 133b with which a higher cache hit rate in execution of the object code 133b is achieved.

Details of First Embodiment

Next, the first embodiment is described in detail. FIGS. 12 to 17 are flowcharts illustrating details of compiling processing of the first embodiment. FIGS. 18 to 24 are diagrams for explaining the details of compiling processing of the first embodiment.

Compiling Processing Performed by Analysis Unit of Compiler

Figure 12:
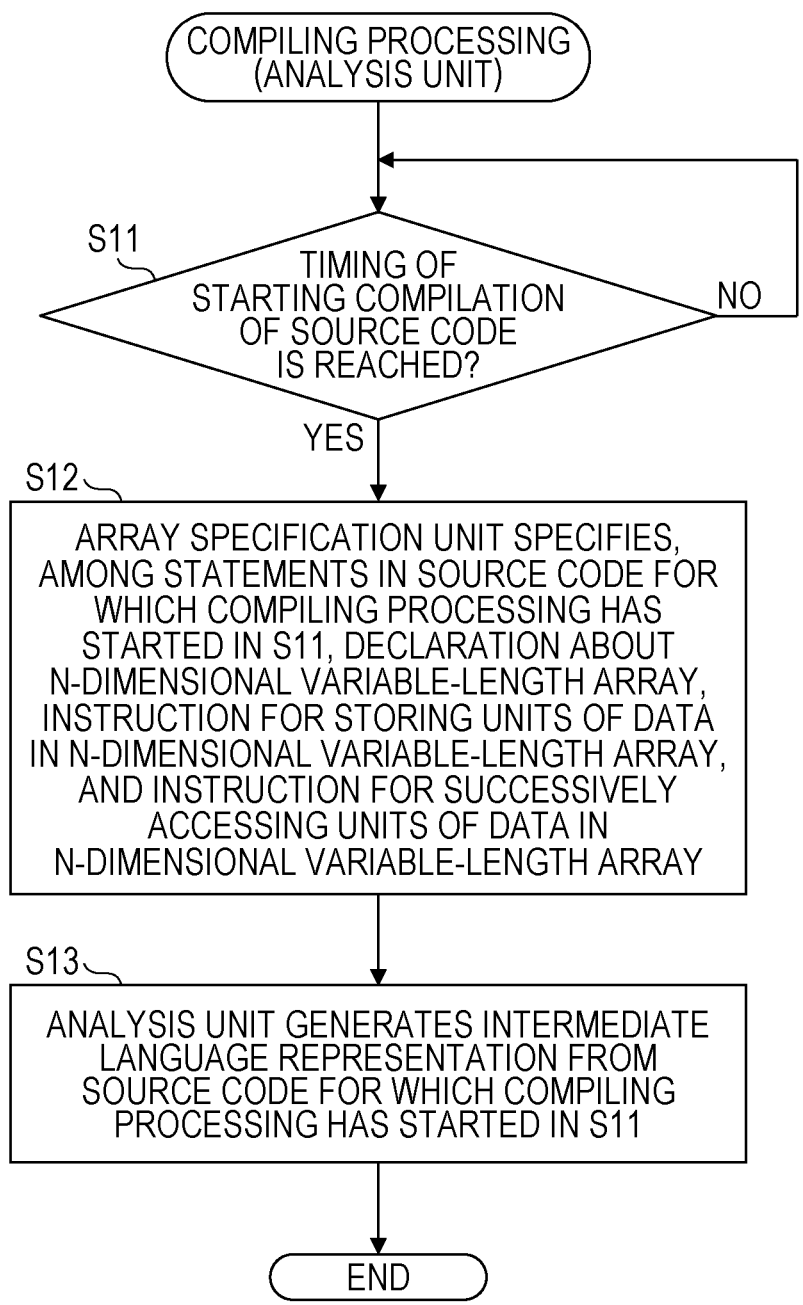
FIG. 12 is a flowchart illustrating details of compiling processing of the first embodiment.

Firstly, compiling processing performed by the analysis unit 11a of the compiler 11 is described. FIG. 12 is a flowchart illustrating compiling processing performed by the analysis unit 11a.

As illustrated in FIG. 12, the analysis unit 11a waits until the timing of starting compilation of the source code 131b is reached (NO in S11).

When the timing of starting compiling processing is reached (YES in S11), the array specification unit 111 of the analysis unit 11a specifies, among the statements in the source code 131b for which the compiling processing has started in S11, a declaration about an N-dimensional variable-length array, an instruction for storing units of data in an N-dimensional variable-length array, and an instruction for successively accessing units of data in an N-dimensional variable-length array (S12). A specific example of the processing in S12 is described below.

Specific Example of Processing in S12

FIG. 18 illustrates a specific example of the source code 131b.

CODE1 in the source code 131b illustrated in FIG. 18 includes a declaration vector<vector<double>>v for the array v as a two-dimensional variable-length array of a class template vector<vector<class T>> in C++. CODE2 in the source code 131b illustrated in FIG. 18 includes an instruction v[i][j].push_back(<double>j*1.5); for storing particular data in an N-dimensional variable-length array. CODE3 in the source code 131b illustrated in FIG. 18 includes a declaration vector<vector>::iterator inner_v; for an instruction for successively accessing units of data stored in an N-dimensional variable-length array. In this case, in the processing in S12, the array specification unit 111 specifies a declaration about an N-dimensional variable-length array, an instruction for storing units of data in an N-dimensional variable-length array, and an instruction for successively accessing units of data in an N-dimensional variable-length array. Hereinafter, it is assumed that the declaration about an N-dimensional variable-length array and the other instructions are all specified in the processing in S12.

Referring back to FIG. 12, the analysis unit 11a generates the intermediate language representation 132b from the source code 131b for which the compiling processing has started in the processing in S11 (S13).

Compiling Processing Performed by Optimization Unit of Compiler

Secondly, compiling processing performed by the optimization unit 11b of the compiler 11 is described. FIG. 13 is a flowchart illustrating compiling processing performed by the optimization unit 11b.

As illustrated in FIG. 13, the optimization unit 11b waits until the analysis unit 11a completes the generation of the intermediate language representation 132b (NO in S21).

When the generation of the intermediate language representation 132b has been completed (YES in S21), the optimization unit 11b determines whether a declaration about an N-dimensional variable-length array, an instruction for storing units of data in an N-dimensional variable-length array, and an instruction for successively accessing units of data in an N-dimensional variable-length array are specified in the processing in S12 (S22).

In a case where it is determined that the declaration about an N-dimensional variable-length array and the other instructions are all specified (YES in S23), the type conversion unit 112 of the optimization unit 11b modifies the intermediate language representation 132b generated in the processing in S13 so as to convert the declaration about an N-dimensional variable-length array included in the intermediate language representation 132b into a declaration about an N-dimensional fixed-length array (S24).

Specifically, the type conversion unit 112 modifies the intermediate language representation 132b so as to convert, among the statements in the source code 131b illustrated in FIG. 18, a declaration about the array v of a class template vector<vector<class T>> (a description included in CODE1) into a declaration about the array data [100][100] of a class template Array<Array<class T>>.

Subsequently, the storage changing unit 113 of the optimization unit 11b modifies the intermediate language representation 132b generated in the processing in S13 so as to convert, among the instructions included in the intermediate language representation 132b, an instruction for storing units of data in an N-dimensional variable-length array into an instruction for storing units of data in an N-dimensional fixed-length array and an instruction for generating the address information 135 indicating addresses at which units of data are stored in an N-dimensional fixed-length array (S25). A specific example of the address information 135 will be described later.

Since the declaration about the array v (an N-dimensional variable-length array) included in the intermediate language representation 132b generated in the processing in S13 is converted into the declaration about the array data (an N-dimensional fixed-length array) in the processing in S24, a function push_back that is called in execution of the object code 133b generated from the intermediate language representation 132b (a function included in CODE2 in the source code 131b illustrated in FIG. 18) is changed from the vector class to the Array class.

In regard to this point, for example, before performing the compiling processing of the present embodiment, the operator creates an Array Extend class inheriting the Array class in the standard template library (STL) and adds in advance the Array class push_back as a new member function including an instruction for storing units of data in the array data (an N-dimensional fixed-length array) and an instruction for generating the address information 135 indicating addresses at which the units of data are stored in the array data, and as a result, it is possible to cause the optimization unit 11b to perform the processing in S25 without modifying a portion that is included in the intermediate language representation 132b generated in the processing in S13 and that corresponds to CODE2.

Figure 14:
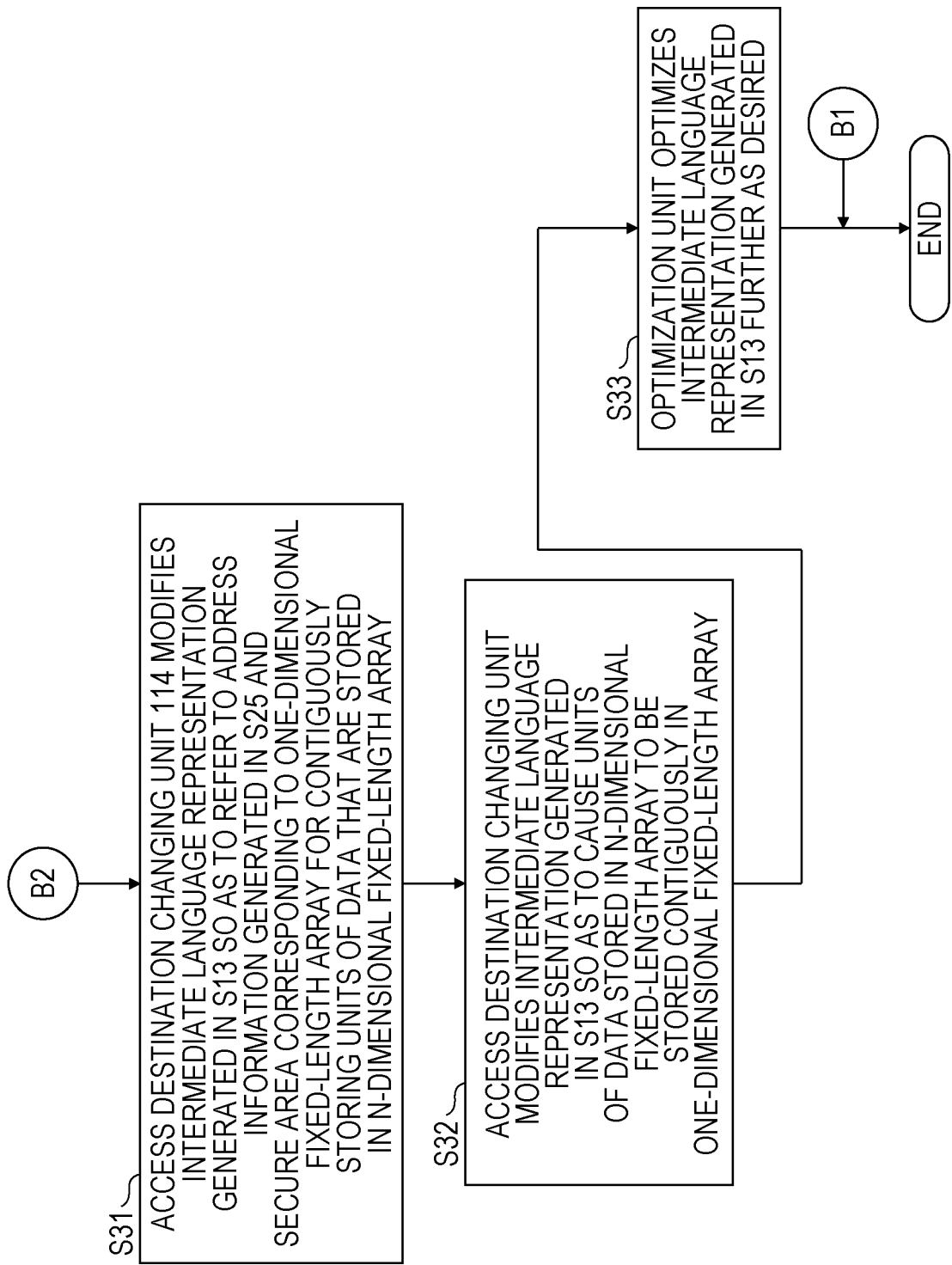
FIG. 14 is a flowchart illustrating details of compiling processing of the first embodiment.

As illustrated in FIG. 14, the access destination changing unit 114 of the optimization unit 11b modifies the intermediate language representation 132b generated in the processing in S13 so as to refer to the address information 135 generated in the processing in S25 and secure in the memory 102 an area corresponding to a one-dimensional fixed-length array for contiguously storing units of data that are stored in an N-dimensional fixed-length array (S31).

Specifically, as illustrated in FIG. 11, the access destination changing unit 114, for example, modifies the intermediate language representation 132b so as to secure, as an area corresponding to the array data, an area of the size enough to store the units of data stored in the array data2.

Here, before performing the compiling processing of the present embodiment, the operator may, for example, creates an Array Extend class inheriting the Array class and adds in advance a new function for performing the processing in S31 and subsequent steps as a member function by referring to the address information 135. Specifically, for example, in execution of the object code 133b, when a function begin as an Array class member function (a function included in CODE3 in the source code 131b illustrated in FIG. 18) is called, the operator, on the basis that the address information 135 has been generated, adds a function that is called instead of the function begin and that calls the function begin in the Array Extend class as a new member function.

In this manner, the operator is able to cause the optimization unit 11b to perform the processing in S31 and subsequent steps without, for example, changing the portion enclosed as a loop in CODE3 included in the intermediate language representation 132b generated in the processing in S13.

The access destination changing unit 114 then modifies the intermediate language representation 132b generated in the processing in S13 so as to cause the units of data stored in the N-dimensional fixed-length array to be stored contiguously in a one-dimensional fixed-length array (S32).

Specifically, the access destination changing unit 114 modifies the intermediate language representation 132b so as to, for example, cause the units of data stored in the array data to be stored contiguously in the array data2.

Hereinafter, in the processing performed along with the execution of the object code 133b generated from the intermediate language representation 132b (hereinafter also referred to as the object execution processing), a portion of the processing in regard to the intermediate language representation 132b modified in the processing in S32 is described.

Object Execution Processing

Figure 15:
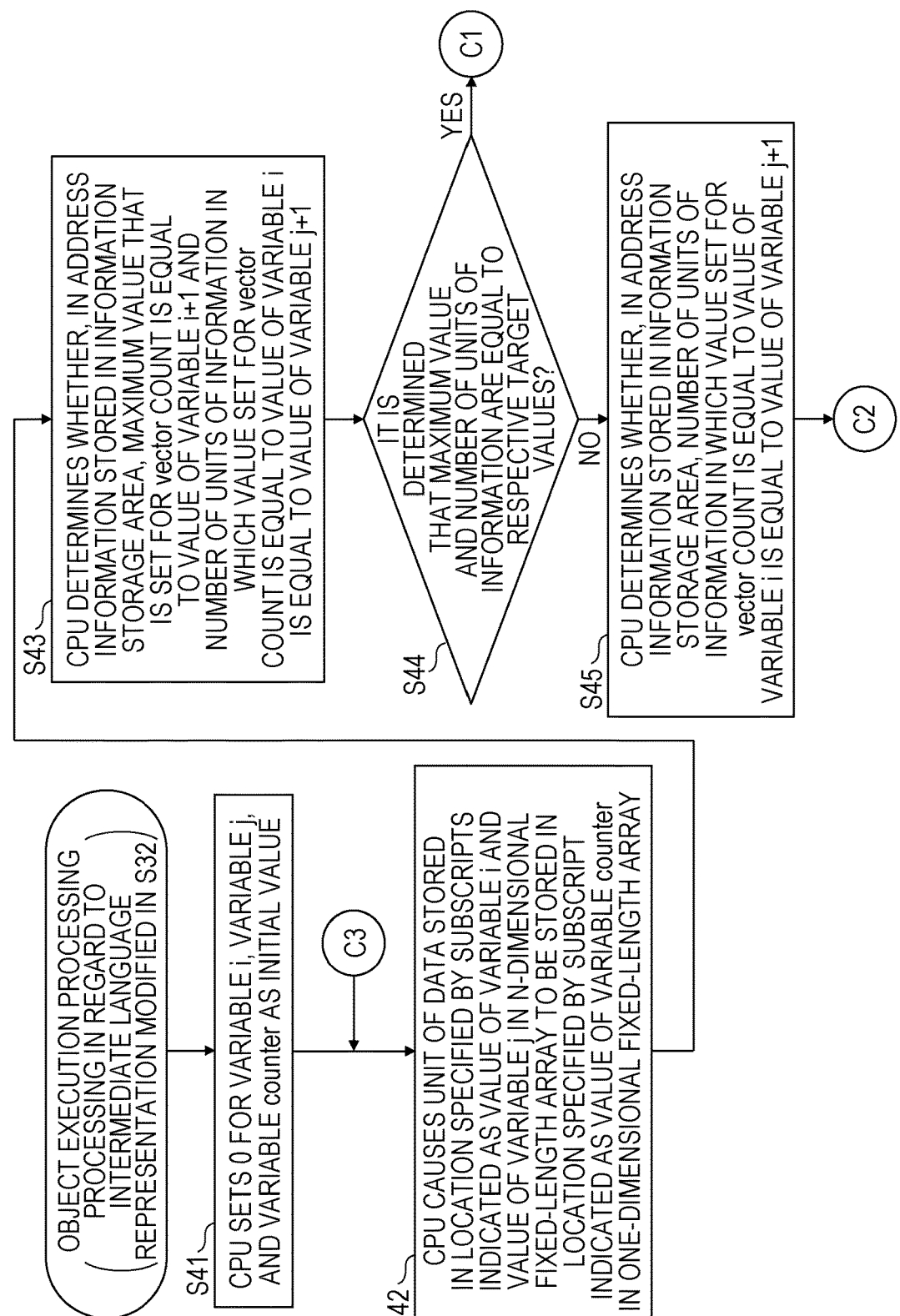
FIG. 15 is a flowchart illustrating details of compiling processing of the first embodiment.
Figure 16:
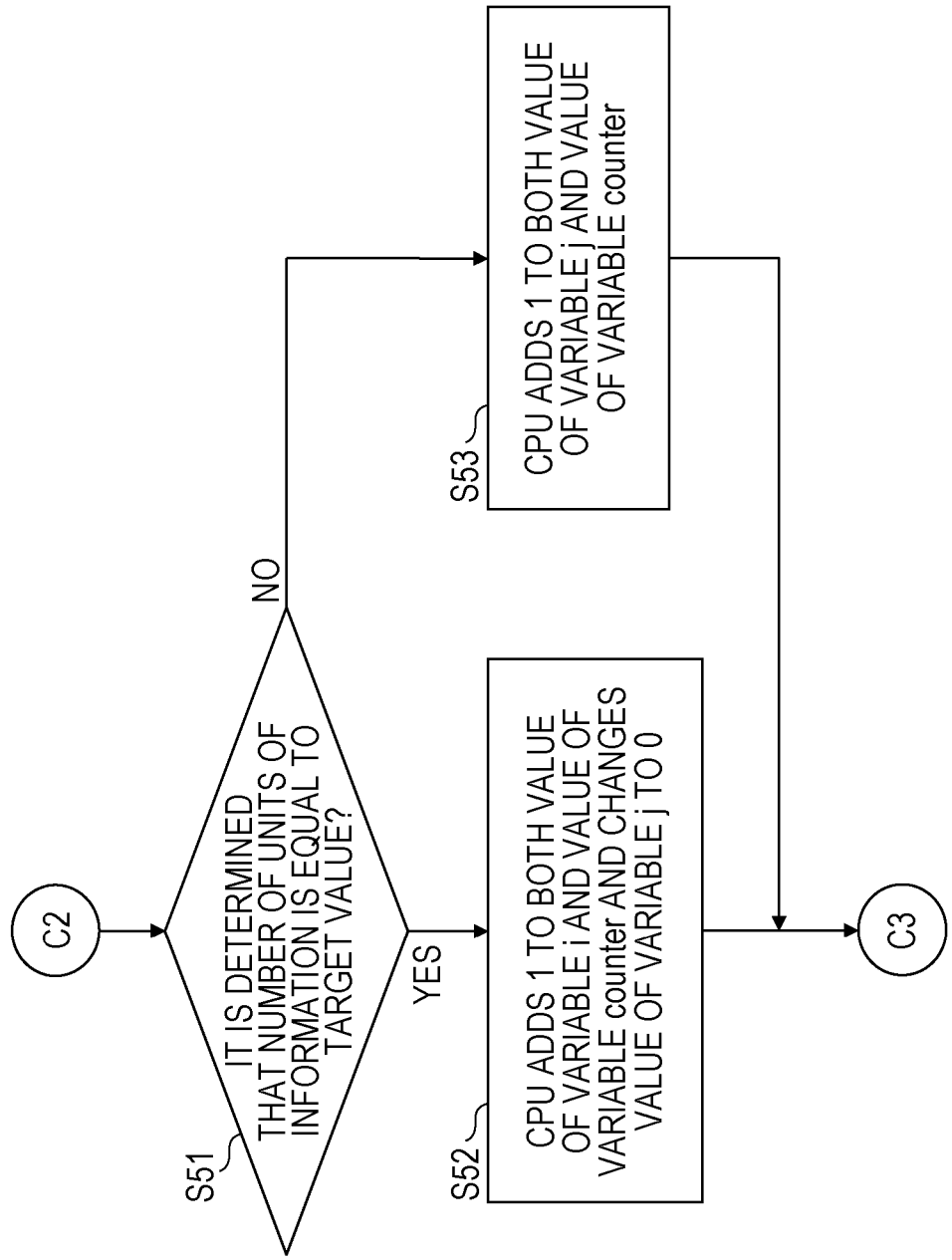
FIG. 16 is a flowchart illustrating details of compiling processing of the first embodiment.
Figure 17:
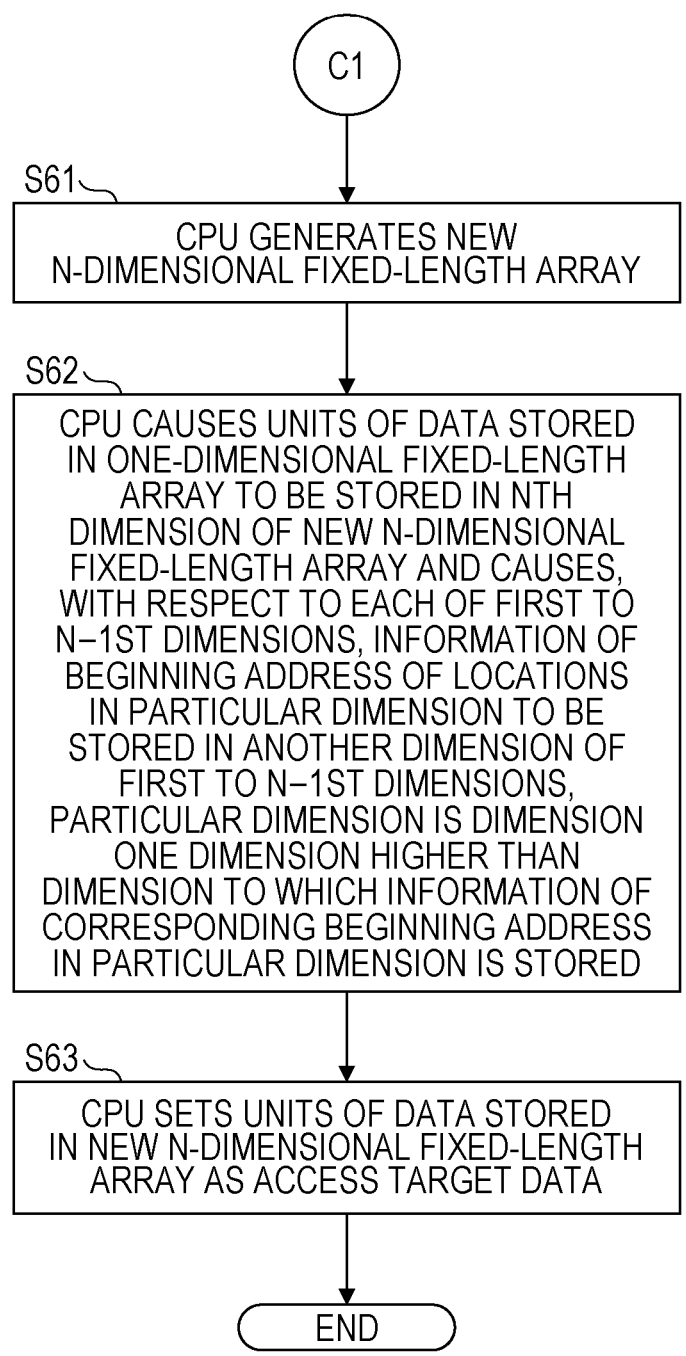
FIG. 17 is a flowchart illustrating details of compiling processing of the first embodiment.

FIGS. 15 to 17 are flowcharts illustrating a portion of the object execution processing. The following description is about a case in which the object code 133b is executed by the information processing apparatus 1 (the CPU 101).

As illustrated in FIG. 15, the CPU 101 sets, for example, 0 for each of a variable i, a variable j, and a variable counter as an initial value (S41).

The CPU 101 causes a unit of data stored in a location specified by subscripts indicated as the value of the variable i and the value of the variable j in an N-dimensional fixed-length array to be stored in a location specified by a subscript indicated as the value of the variable counter in a one-dimensional fixed-length array (S42).

The CPU 101 then determines whether, in the address information 135 stored in the information storage area 130, the maximum value that is set for the vector count is equal to the value of a variable i+1 and the number of units of information in which the value set for the vector count is equal to the value of the variable i is equal to the value of a variable j+1 (S43).

In a case where it is determined that both the maximum value and the number of units of information are not equal to the respective target values (NO in S44), the CPU 101 determines whether, in the address information 135 stored in the information storage area 130, the number of units of information in which the value set for the vector count is equal to the value of the variable i is equal to the value of the variable j+1 (S45).

As illustrated in FIG. 16, in a case where it is determined that the number of units of information is equal to the target value (YES in S51), the CPU 101 adds 1 to both the value of the variable i and the value of the variable counter and changes the value of the variable j to 0 (S52). Conversely, it is determined the number of units of information is not equal to the target value (NO in S51), the CPU 101 adds 1 to both the value of the variable j and the value of the variable counter (S53). Subsequently, the CPU 101 repeats the processing in S42 and subsequent steps.

In a case where it is determined that both the maximum value and the number of units of information are equal to the respective target values (YES in S44), the CPU 101 generates a new N-dimensional fixed-length array as illustrated in FIG. 17 (S61).

The CPU 101 then causes the units of data stored in the one-dimensional fixed-length array to be stored in the Nth dimension of the new N-dimensional fixed-length array and causes, with respect to each of the first to N−1st dimensions, information of the beginning address of locations in a particular dimension to be stored in another dimension of the first to N−1st dimensions, the particular dimension is a dimension one dimension higher than the other dimension to which information of the corresponding beginning address in the particular dimension is stored (S62).

The CPU 101 sets the units of data stored in the new N-dimensional fixed-length array as access target data (S63).

To be specific, the CPU 101 sets, as access target data, the units of data stored in the new N-dimensional fixed-length array generated in the processing in S61 instead of the units of data stored in the one-dimensional fixed-length array in the processing in S42.

In this manner, the operator is not desired to change the portion enclosed as a loop in CODE3 included in the intermediate language representation 132*b* generated in the processing in S13.

Referring back to FIG. 14, the optimization unit 11*b* optimizes the intermediate language representation 132*b* generated in the processing in S13 further as desired (S33). The optimization unit 11*b* then ends optimizing the intermediate language representation 132*b* generated in the processing in S13.

In a case where it is determined in the processing in S22 that at least one of the declaration about an N-dimensional variable-length array and the other instructions is not specified (NO in S23), the optimization unit 11*b* similarly ends optimizing the intermediate language representation 132*b*.

First Specific Example in Execution of Instruction Modified in Processing in S25

Figure 19:
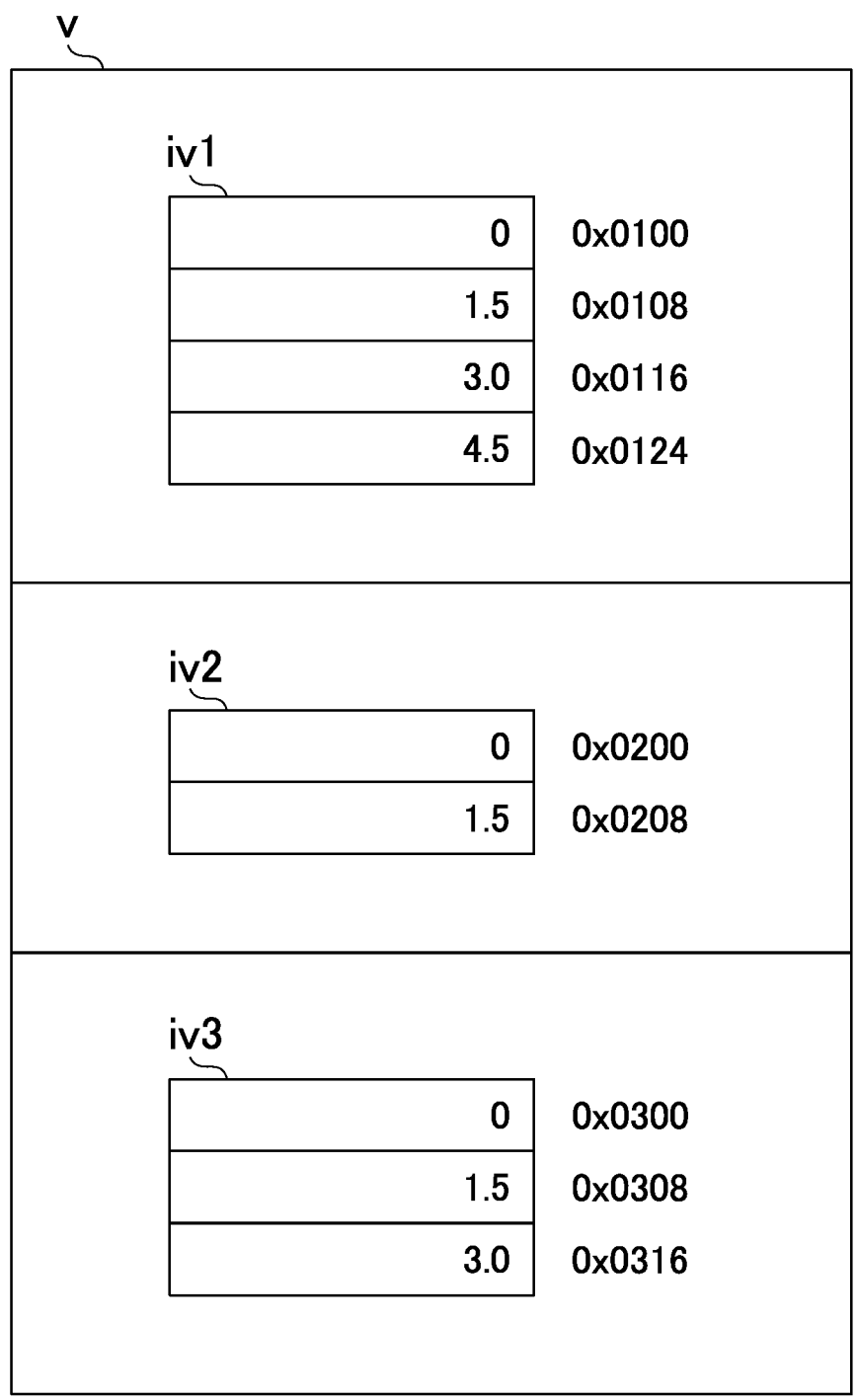
FIG. 19 illustrates a specific example in execution of an instruction modified in processing in S25.
Figure 20:
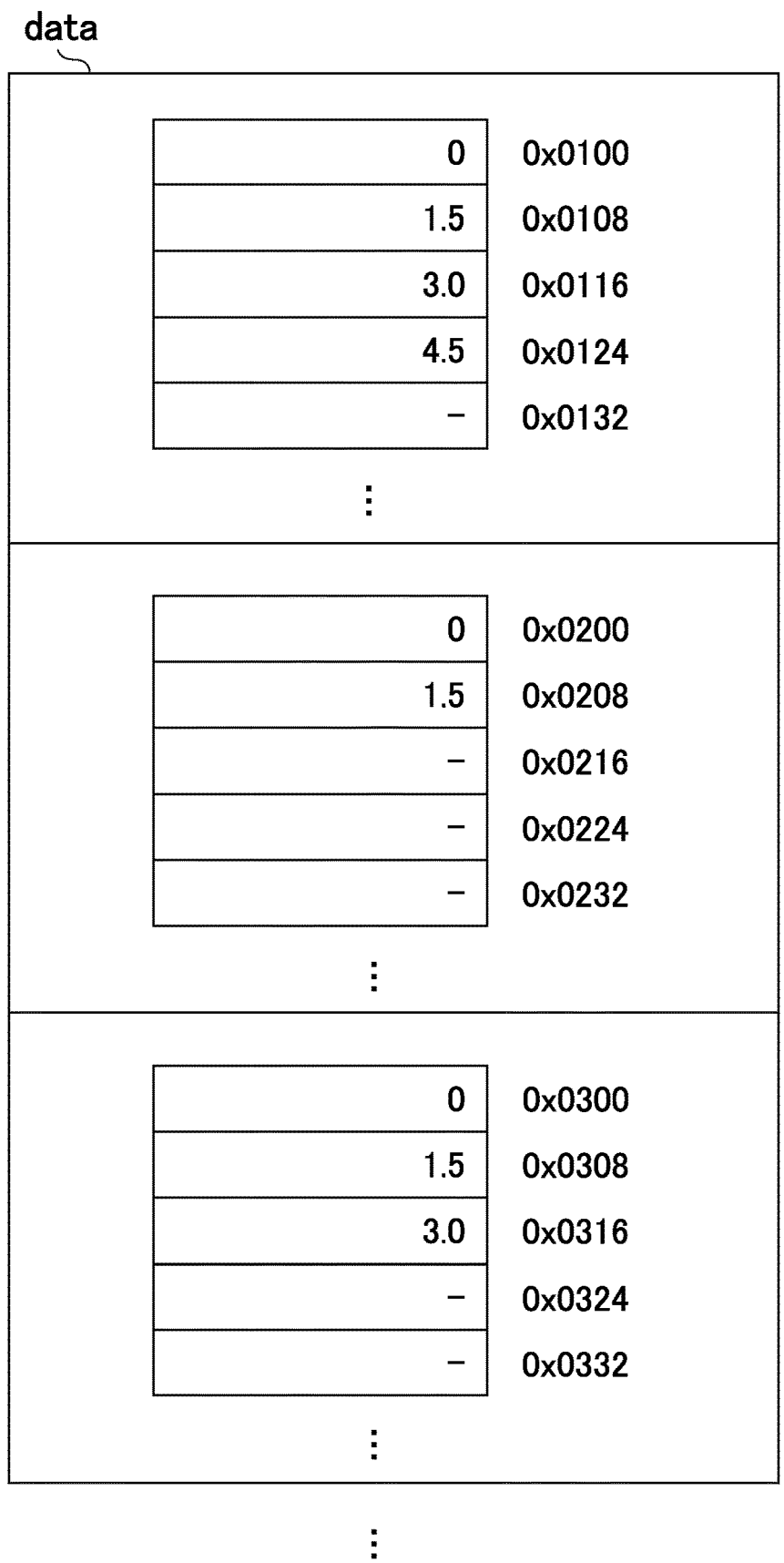
FIG. 20 illustrates another specific example in execution of the instruction modified in processing in S25.

Next, among the instructions modified in the processing in S25 in the intermediate language representation 132*b*, a specific example in execution of the instruction for storing units of data in an N-dimensional fixed-length array (in execution of the object code 133*b*) is described. FIGS. 19 and 20 illustrate specific examples in execution of the instruction modified in the processing in S25 in the intermediate language representation 132*b*.

Firstly, a specific example of the array v is described. FIG. 19 illustrates a specific example of the array v.

The array v illustrated in FIG. 19 includes an array iv1, an array iv2, and an array iv3. The array iv1 illustrated in FIG. 19 contains 0 stored in a location at address 0x0100, 1.5 stored in a location at address 0x0108, 3.0 stored in a location at address 0x0116, and 4.5 stored in a location at address 0x0124. The description of other information illustrated in FIG. 19 is omitted.

Next, a specific example of the array data is described. FIG. 20 illustrates a specific example of the array data.

The array data illustrated in FIG. 20 includes, as elements of the first dimension, 0 stored in a location at address 0x0100, 1.5 stored in a location at address 0x0108, 3.0 stored in a location at address 0x0116, and 4.5 stored in a location at address 0x0124. Among the elements in the locations of the first dimension of the array data illustrated in FIG. 20, no data is stored in elements in locations at address 0x0132 or subsequent addresses. The description of other information illustrated in FIG. 20 is omitted.

For example, when the CPU 101 executing the object code 133*b* (hereinafter also simply referred to as the CPU 101) executes the instruction modified in the processing in S25, the CPU 101 causes the units of data to be stored in the array data (stored as illustrated in FIG. 20) instead of being stored in the array v (stored as illustrated in FIG. 19).

Second Specific Example in Execution of Instruction Modified in Processing in S25

Next, among the instructions modified in the processing in S25 in the intermediate language representation 132*b*, a specific example in execution of the instruction for generating the address information 135 (in execution of the object code 133*b* generated from the source code 131*b*) is described. FIG. 21 illustrates a specific example of the address information 135.

The address information 135 illustrated in FIG. 21 includes, as fields of items, the vector count as which information indicating an array included in the array v corresponding to specific units of data is set, the address as which the beginning address of contiguous locations storing the specific units of data is set, and the number of units of data as which the number of the specific units of data stored in the contiguous locations is set. As the vector count, for example, one of the values of 1, 2, and 3 that correspond respectively to the array vi1, the array vi2, and the array vi3 of the array v illustrated in FIG. 19 is set.

Specifically, the array data illustrated in FIG. 20 includes four units of data in elements in locations starting with the beginning address 0x0100 as the elements of the first dimension (elements of the dimension corresponding to the array vi1), two units of data in elements in locations starting with the beginning address 0x0200 as the elements of the second dimension (elements of the dimension corresponding to the array vi2), and three units of data in elements in locations starting with the beginning address 0x0300 as the elements of the third dimension (elements of the dimension corresponding to the array vi3).

Accordingly, the CPU 101 sets 1 as the vector count, 0x0100 as the address, and 4 as the number of units of data with regard to the record whose record number is 1 as illustrated in FIG. 21.

The CPU 101 also sets 2 as the vector count, 0x0200 as the address, and 2 as the number of units of data with regard to the record whose record number is 2.

The CPU 101 also sets 3 as the vector count, 0x0300 as the address, and 3 as the number of units of data with regard to the record whose record number is 3.

Specific Example in Execution of Instruction Modified in Processing in S31

Next, a specific example in execution of the instruction modified in the processing in S31 (in execution of the object code 133*b* generated from the source code 131*b*) is described.

In the address information 135 illustrated in FIG. 21, the values of 1, 2, and 3 are set as the vector counts and the values of 4, 2, and 3 are set as the numbers of units of data. Accordingly, the CPU 101 multiplies, for example, 9 that is the total of values set as the numbers of units of data by 8 (bytes) that is the size of a unit of data (for example, double-type data) and consequently obtains 72 (bytes). The CPU 101 thus secures an area of the size of 72 (bytes) as the area for the array data2.

Specific example in execution of instruction modified in processing in S32

Next, a specific example in execution of the instruction modified in the processing in S32 (in execution of the object code 133*b* generated from the source code 131*b*) is described. FIGS. 22 to 24 illustrate specific examples in execution of the instruction modified in the processing in S32.

The array data illustrated in FIG. 20 includes, as elements of the first dimension, 0 stored in a location at address 0x0100, 1.5 stored in a location at address 0x0108, 3.0 stored in a location at address 0x0116, and 4.5 stored in a location at address 0x0124.

In a case where the value of the variable i is 0, the value of the variable j is 0, and the value of the variable counter is 0, the CPU 101 causes 0 stored in the array data [0][0] to be stored in the array data2 [0] as illustrated in FIG. 22 (a first performance of the processing in S42). In a case where the value of the variable i is 0, the value of the variable j is 1, and the value of the variable counter is 1, the CPU 101 causes 1.5 stored in the array data [0][1] to be stored in the array data2 [1] as illustrated in FIG. 22 (a second performance of the processing in S42). In a case where the value of the variable i is 0, the value of the variable j is 2, and the value of the variable counter is 2, the CPU 101 causes 3.0 stored in the array data [0][2] to be stored in the array data2 [2] as illustrated in FIG. 22 (a third performance of the processing in S42). In a case where the value of the variable i is 0, the value of the variable j is 3, and the value of the variable counter is 3, the CPU 101 causes 4.5 stored in the array data [0][3] to be stored in the array data2 [3] as illustrated in FIG. 22 (a fourth performance of the processing in S42).

Here, as the number of units of data in the record whose vector count is 1 in the address information 135 illustrated in FIG. 21, that is, the record whose record number is 1, the value of 4 is set that is obtained by adding 1 to 3 equal to the current value of the variable j (NO in S44 and YES in S51). Accordingly, the CPU 101 changes the value of the variable i to 1, the value of the variable counter to 4, and the value of the variable j to 0 (S52).

The CPU 101 then repeats the processing in S42 and subsequent steps, and as a result, causes the units of data stored in the array data illustrated in FIG. 21 to be stored in the array data2 as illustrated in FIG. 22.

Since the variable-length array specified in the processing in S12 is a two-dimensional array, the CPU 101 then generates an array data2_box as a new two-dimensional fixed-length array (S61).

The CPU 101 causes the units of data stored in the array data2 in the processing in S42 to be stored in the second dimension of the array data2_box as illustrated in FIG. 23. In this case, the CPU 101 causes the beginning address 0x3000 of the locations corresponding to the second dimension of the array data2_box to be stored in the first dimension of the array data2_box (S62).

It is noted that, when the variable-length array specified in the processing in S12 is three-dimensional or higher, the CPU 101 may generate an array dataN_box as a new fixed-length array having three or more dimensions.

Specifically, in a case where the variable-length array specified in the processing in S12 is, for example, a three-dimensional array, the CPU 101 generates an array data3_box as a new three-dimensional fixed-length array. The CPU 101 then causes the units of data stored in the array data2 in the processing in S42 to be stored in the third dimension of the array data3_box as illustrated in FIG. 24. In this case, the CPU 101 causes the beginning address 0x4000 of the locations corresponding to the third dimension of the array data3_box to be stored in the second dimension of the array data3_box and the beginning address 0x3000 of the locations corresponding to the second dimension of the array data3_box to be stored in the first dimension of the array data3_box.

As described above, when compiling the source code 131*b*, in a case where the source code 131*b* includes an instruction for storing particular data in an N-dimensional variable-length array, the compiler 11 of the present embodiment generates the object code 133*b* so as to cause the particular data to be stored in an N-dimensional fixed-length array instead of the N-dimensional variable-length array.

When compiling the source code 131*b*, in a case where the source code 131*b* includes an instruction for successively accessing units of data stored in an N-dimensional variable-length array, the compiler 11 generates the object code 133*b* so as to cause the units of data stored in the N-dimensional fixed-length array to be stored contiguously in a one-dimensional fixed-length array and cause the units of data stored in the one-dimensional fixed-length array to be successively accessed.

In other words, in a case where the source code 131 includes an instruction for storing units of data in an N-dimensional variable-length array, the compiler 11 of the present embodiment generates the object code 133 by converting the instruction for storing units of data in an N-dimensional variable-length array into an instruction for storing units of data contiguously in a one-dimensional fixed-length array.

In this manner, the compiler 11 is able to generate the object code 133*b* with which the access to units of data stored in discrete memory locations is not desired. The compiler 11 is therefore able to generate the object code 133*b* with which a higher cache hit rate in execution of the object code 133*b* is achieved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and the processor configured to:
specify, based on a source code, an N-dimensional variable-length array, an instruction for storing particular data of data in the N-dimensional variable-length array, and an instruction for successively accessing the particular data in the N-dimensional variable-length array;
generate an intermediate language representation based on the source code;
when the source code includes the instruction for storing the particular data in an area of the N-dimensional variable-length array (N being an integer and a value of N being equal to or greater than 2), generate object code in the memory to cause the particular data to be stored in an area of the N-dimensional fixed-length array instead of the area of the N-dimensional variable-length array; and
when the source code includes the instruction for successively accessing the particular data stored in the area of the N-dimensional variable-length array, generate the object code in the memory to cause the particular data stored in the area of the N-dimensional fixed-length array to be stored contiguously in an area of a one-dimensional fixed-length array.

2. The information processing apparatus according to claim 1, wherein
the memory stores address information indicating addresses at which the units of data are stored, and
the processor generates the object code to refer to the memory storing the address information, to specify locations in which the units of data are stored in the area of the N-dimensional fixed-length array, and to cause the units of data stored in the specified locations to be stored in the area of the one-dimensional fixed-length array.

3. The information processing apparatus according to claim 2, wherein the processor generates the object code to refer to the memory storing the address information, to calculate a total data length of the units of data stored in the area of the N-dimensional fixed-length array, and to secure an area of the calculated total data length as the area of the one-dimensional fixed-length array before storing the units of data stored in the area of the N-dimensional fixed-length array.

4. The information processing apparatus according to claim 2, wherein the address information includes beginning address information indicating a beginning address of a contiguous area in which the units of data are stored in the N-dimensional fixed-length array and data unit number information indicating a number of the units of data stored in the contiguous area.

5. The information processing apparatus according to claim 1, wherein the processor generates the object code to, after causing the units of data stored in the area of the N-dimensional fixed-length array to be stored in the area of the one-dimensional fixed-length array, generate a new N-dimensional fixed-length array, to store units of information of beginning addresses of areas corresponding to second to Nth dimensions of N dimensions of the generated new N-dimensional fixed-length array respectively in areas corresponding to first to N−1th dimensions of the N dimensions, to cause the units of data stored in the one-dimensional fixed-length array to be stored in an area corresponding to the Nth dimension of the N dimensions, and to successively access the units of data stored in the area of the new N-dimensional fixed-length array.

6. The information processing apparatus according to claim 1, further comprising a data cache coupled to the processor and the memory.

7. A compiling method executed by a computer, comprising:
specifying, based on a source code, an N-dimensional variable-length array, an instruction for storing particular data of data in the N-dimensional variable-length array, and an instruction for successively accessing the particular data in the N-dimensional variable-length array;
generating an intermediate language representation based on the source code;
when the source code includes the instruction for storing the particular data in an area of the N-dimensional variable-length array (N being an integer and a value of N being equal to or greater than 2), generating object code in the memory to cause the particular data to be stored in an area of the N-dimensional fixed-length array instead of the area of the N-dimensional variable-length array; and
when the source code includes the instruction for successively accessing the particular data stored in the area of the N-dimensional variable-length array, generating the object code in the memory to cause the particular data stored in the area of the N-dimensional fixed-length array to be stored contiguously in an area of a one-dimensional fixed-length array.

8. The method according to claim 7, wherein
storing address information indicating addresses at which the units of data are stored, and
generating the object code to refer to the memory for storing the address information, specifying locations in which the units of data are stored in the area of the N-dimensional fixed-length array, and causing the units of data stored in the specified locations to be stored in the area of the one-dimensional fixed-length array.

9. A non-transitory computer-readable recording medium storing therein a program for causing a computer to execute a process, the process comprising:
specifying, based on a source code, an N-dimensional variable-length array, an instruction for storing particular data of data in the N-dimensional variable-length array, and an instruction for successively accessing the particular data in the N-dimensional variable-length array;
generating an intermediate language representation based on the source code;
when the source code includes the instruction for storing the particular data in an area of the N-dimensional variable-length array (N being an integer and a value of N being equal to or greater than 2), generating object code in the memory to cause the particular data to be stored in an area of the N-dimensional fixed-length array instead of the area of the N-dimensional variable-length array; and
when the source code includes the instruction for successively accessing the particular data stored in the area of the N-dimensional variable-length array, generating the object code in the memory to cause the particular data stored in the area of the N-dimensional fixed-length array to be stored contiguously in an area of a one-dimensional fixed-length array.

* * * * *